(12) United States Patent
Mihara et al.

(10) Patent No.: US 7,423,868 B2
(45) Date of Patent: Sep. 9, 2008

(54) APPARATUS FOR MOUNTING STORAGE DEVICE, INTEGRAL UNIT, AND ELECTRONIC DEVICE

(75) Inventors: Daisuke Mihara, Kawasaki (JP); Takeshi Murakami, Kanagawa (JP); Hiroyuki Mochizuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/902,548

(22) Filed: Jul. 29, 2004

(65) Prior Publication Data

US 2005/0135057 A1  Jun. 23, 2005

(30) Foreign Application Priority Data

Dec. 19, 2003  (JP)  ............................. 2003-423875

(51) Int. Cl.
*H05K 7/20* (2006.01)
*F16M 13/00* (2006.01)
*G11B 33/12* (2006.01)

(52) U.S. Cl. ..................... 361/685; 248/634; 248/636; 267/136; 720/652

(58) Field of Classification Search ............ 360/97.01, 360/98.01, 137, 137 D, 685; 361/685; 369/75.11–82; 312/332.1, 333, 223.1; 248/500; 267/136–141; 211/26, 187, 190; 720/652, 601
See application file for complete search history.

(56) References Cited

U.S. PATENT DOCUMENTS

| 5,065,262 | A |   | 11/1991 | Blackborow et al. | ......... 360/75 |
| 5,208,722 | A |   | 5/1993  | Ryan et al. | ............... 360/99.01 |
| 5,463,527 | A | * | 10/1995 | Hager et al. | ................ 361/685 |
| 5,668,697 | A | * | 9/1997  | Dowdy | ....................... 361/685 |
| 5,687,059 | A | * | 11/1997 | Hoppal | ....................... 361/685 |
| 5,731,934 | A |   | 3/1998  | Brooks et al. | ............... 360/106 |
| 5,768,099 | A | * | 6/1998  | Radloff et al. | ............. 361/685 |
| 5,777,845 | A | * | 7/1998  | Krum et al. | ................. 361/685 |
| 5,788,211 | A | * | 8/1998  | Astier | ........................ 248/674 |
| 5,921,644 | A | * | 7/1999  | Brunel et al. | ............ 312/223.2 |
| 5,940,265 | A | * | 8/1999  | Ho | .............................. 361/685 |
| 5,943,208 | A | * | 8/1999  | Kato et al. | .................. 361/685 |

(Continued)

FOREIGN PATENT DOCUMENTS

CN   1403893   3/2003

(Continued)

OTHER PUBLICATIONS http://www.amazinglaptops.com/display16.htm; 2003.

(Continued)

*Primary Examiner*—Jayprakash N Gandhi
*Assistant Examiner*—Zachary M Pape
(74) *Attorney, Agent, or Firm*—Greer, Burns & Crain, Ltd.

(57) ABSTRACT

An apparatus for mounting includes a first buffer fixing piece for arranging a first buffer unit to a first hard disk drive (HDD), a holding frame for holding the first HDD that is integrated with the first buffer fixing piece, and for fixing a control board, a second buffer fixing piece for arranging a second buffer unit to a second HDD, and for arranging the second HDD away from a palm rest, and a holding case that holds the second HDD, and is connected to the holding frame.

8 Claims, 26 Drawing Sheets

U.S. PATENT DOCUMENTS

| | | | |
|---|---|---|---|
| 6,317,317 B1 * | 11/2001 | Lu et al. | 361/685 |
| 6,359,836 B1 * | 3/2002 | Sevier et al. | 361/725 |
| 6,388,873 B1 * | 5/2002 | Brooks et al. | 361/685 |
| 6,477,042 B1 * | 11/2002 | Allgeyer et al. | 361/685 |
| 6,570,755 B2 * | 5/2003 | Curlee et al. | 361/683 |
| 6,646,870 B2 * | 11/2003 | Shih | 361/685 |
| 6,657,868 B1 * | 12/2003 | Hsue | 361/728 |
| 6,717,816 B1 * | 4/2004 | Tanaka et al. | 361/728 |

FOREIGN PATENT DOCUMENTS

| | | |
|---|---|---|
| EP | 1 026 688 | 8/2000 |
| JP | 11-86519 | 3/1999 |
| JP | 2000-222871 | 8/2000 |
| JP | 2003-314613 | 11/2003 |

OTHER PUBLICATIONS http://www.amazinglaptops.com/prostar-order8814.htm; 2003.
http://www.amazinglaptops.com/raid.htm; 2003.
http://www.amazinglaptops.com/prostar-8814specs.htm; 2003.
http://www.amazinglaptops.com/prostar-8814image.htm; 2003.

* cited by examiner

APPARATUS FOR MOUNTING STORAGE DEVICE, INTEGRAL UNIT, AND ELECTRONIC DEVICE

BACKGROUND OF THE INVENTION

1) Field of the Invention

The present invention relates to an apparatus for mounting a storage device, an integral unit that includes the apparatus and integrates storage devices, and an electronic device that includes the integral unit.

2) Description of the Related Art

Most of the desktop personal computers (PC) include a plurality of hard disk drives (HDDs) as a storage device. Some other desktop PCs are configured in such a manner that an HDD can be installed in addition to the pre-installed HDDs. A typical desktop PC includes a case and a pair of guiding rails inside the case, and when installing an HDD, the HDD is slid along the guiding rails to a predetermined position.

For example, a vibration isolation structure for an electronic device is disclosed in Japanese Patent Application Laid-Open No. 2003-314613. This vibration isolation structure is resistant to vibrations and allows easy assembly and disassembly of two HDDs. FIG. 29 is a front cross-section and FIG. 30 is a side cross-section of the vibration isolation structure disclosed in the above patent application.

As shown in FIG. 29, the vibration isolation structure includes a holder 240, a sub-holder 241, and a vibration attenuator 211. The holder 240 can be attached to or detached from a case (not shown) of the electronic device (not shown). The sub-holder 241 engages with the holder 240 through the vibration attenuator 211. The sub-holder 241 includes a pair of guiding rails 242, 243. Each guiding rail 242, 243 has two horizontally aligned rails. An HDD 210 is installed in a unit holder 244, and another HDD 210 is installed in a unit holder 245. The unit holders 244, 245 are slid along corresponding rails of the guiding rails 242, 243.

As shown in FIG. 30, each of the HDDs 210 includes a connector 246. The connector 246 of the HDD 210 installed in the unit holder 244 is electrically connected to a floating connector 247. The connector 246 of the HDD 210 installed in the unit holder 245 is electrically connected to a floating connector 248. The floating connectors 247, 248 are electrically connected to a board 249.

The floating connectors 247, 248 are mechanically floating and allow a displacement within a predetermined range. The board 249 is electrically connected to a main circuit 250 through a flexible cable 251.

Thus, the vibration isolation structure suppresses vibrations and allows easy assembly and disassembly of two HDDs. Moreover, the arrangement of the vibration attenuator 211 between the holder 240 and the sub-holder 241 enables to save space inside the case of the electronic device compared to when the vibration attenuator 211 is prepared for each of the HDDs 210.

However, the vibration isolation structure is quite bulky. Therefore, although it could be used in desktop PCs, it is not suitable for portable electronic devices such as laptop computers because of limited space.

Nowadays a technology called RAID (Redundant Array of Inexpensive Disks) is employed even in laptop computers. The RAID enables duplication of data by writing the data simultaneously to more than one HDD. In other words, even laptops are required to have more than one HDD.

Furthermore, the portable electronic devices are susceptible to an external magnetic field because their HDDs are arranged close to the cases. If the HDD is affected by the external magnetic field, the HDD is damaged and data stored in it is lost.

SUMMARY OF THE INVENTION

It is an object of the present invention to solve at least the problems in the conventional technology.

An apparatus for mounting a plurality of storage devices in a mounting section in an electronic device, according to an aspect of the present invention, includes a first holding unit that holds a first storage device; a second holding unit that holds a second storage device; and a connecting unit that connects the first holding unit and the second holding unit in such a manner that there is a predetermined distance between the first storage device and the second storage device. The second holding unit holds the second storage device in such a manner that the second storage device is displaced away by a predetermined distance from an external magnetic field when the second storage device is mounted in the mounting section.

An integral unit according to another aspect of the present invention includes an apparatus usable to mount a plurality of storage devices in a mounting section in an electronic device. The apparatus includes a first holding unit that holds a first storage device; a second holding unit that holds a second storage device; and a connecting unit that connects the first holding unit and the second holding unit in such a manner that there is a predetermined distance between the first storage device and the second storage device. The second holding unit holds the second storage device in such a manner that the second storage device is displaced away by a predetermined distance from an external magnetic field when the second storage device is mounted in the mounting section. Moreover, the first holding unit holds a control board that controls the first storage device and the second storage device.

An electronic device according to still another aspect of the present invention includes an integral unit that includes an apparatus usable to mount a plurality of storage devices in a mounting section in an electronic device. The apparatus includes a first holding unit that holds a first storage device; a second holding unit that holds a second storage device; and a connecting unit that connects the first holding unit and the second holding unit in such a manner that there is a predetermined distance between the first storage device and the second storage device. The second holding unit holds the second storage device in such a manner that the second storage device is displaced away by a predetermined distance from an external magnetic field when the second storage device is mounted in the mounting section. Moreover, the first holding unit holds a control board that controls the first storage device and the second storage device.

A portable electronic device according to still another aspect of the present invention includes a first storage device; a second storage device; a first holding unit that holds the first storage device; a second holding unit that holds the second storage device; a control board that controls the first storage device and the second storage device; a connecting unit that connects the first holding unit and the second holding unit in layers in such a manner that there is a predetermined distance between the first storage device and the second storage device; and a mounting section in which the first holding unit and the second holding unit are installed together with the control board.

The other objects, features, and advantages of the present invention are specifically set forth in or will become apparent from the following detailed description of the invention when read in conjunction with the accompanying drawings.

DETAILED DESCRIPTION

Exemplary embodiments of an apparatus for mounting a storage device, and integral unit that includes the apparatus, an electronic device that includes the integral unit according to the present invention are explained in detail with reference to accompanying drawings. However, the present invention is not to be limited to the embodiments below.

Figure 1:
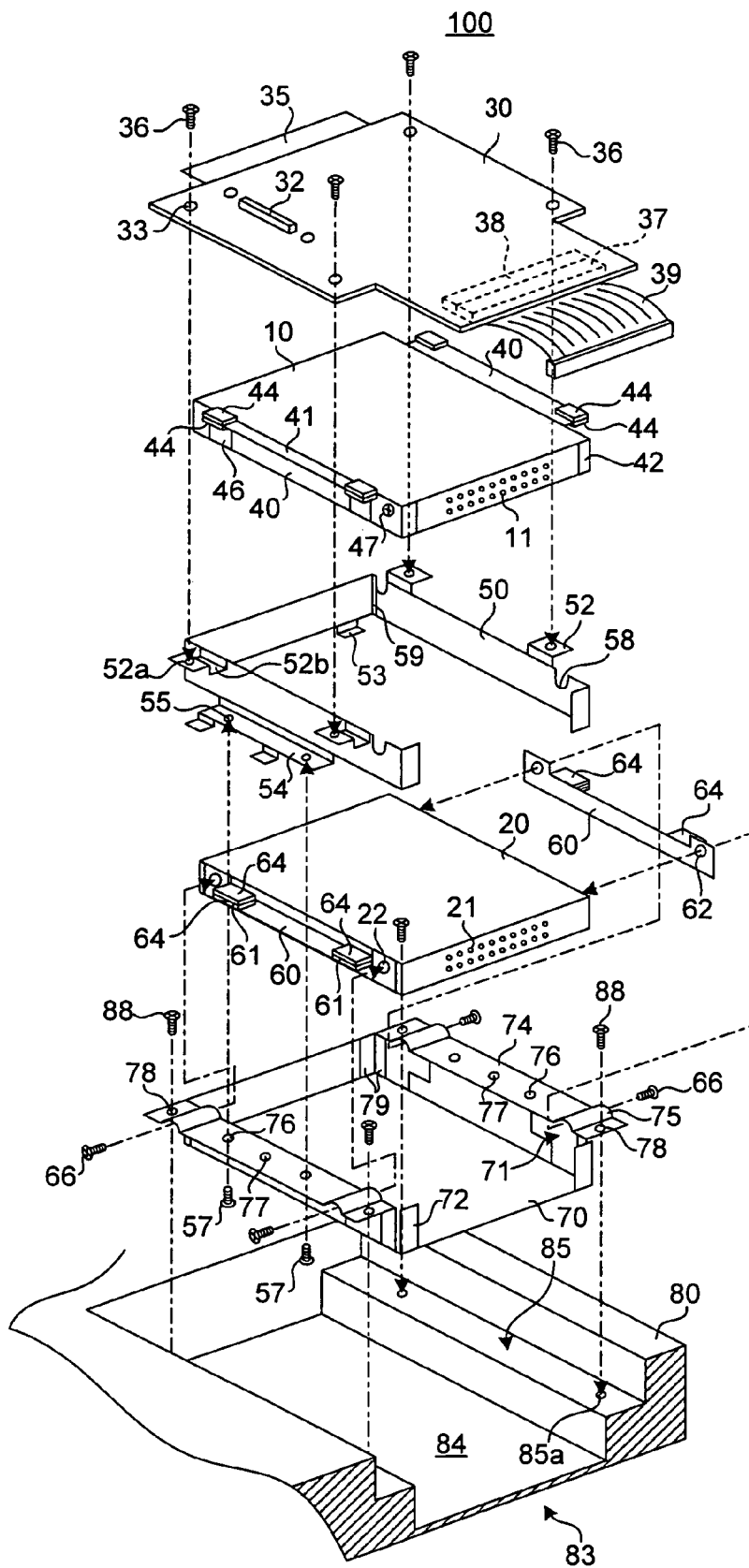
FIG. 1 is an exploded perspective view of an integral unit of an HDD for RAID according to an embodiment of the present invention.
Figure 2:
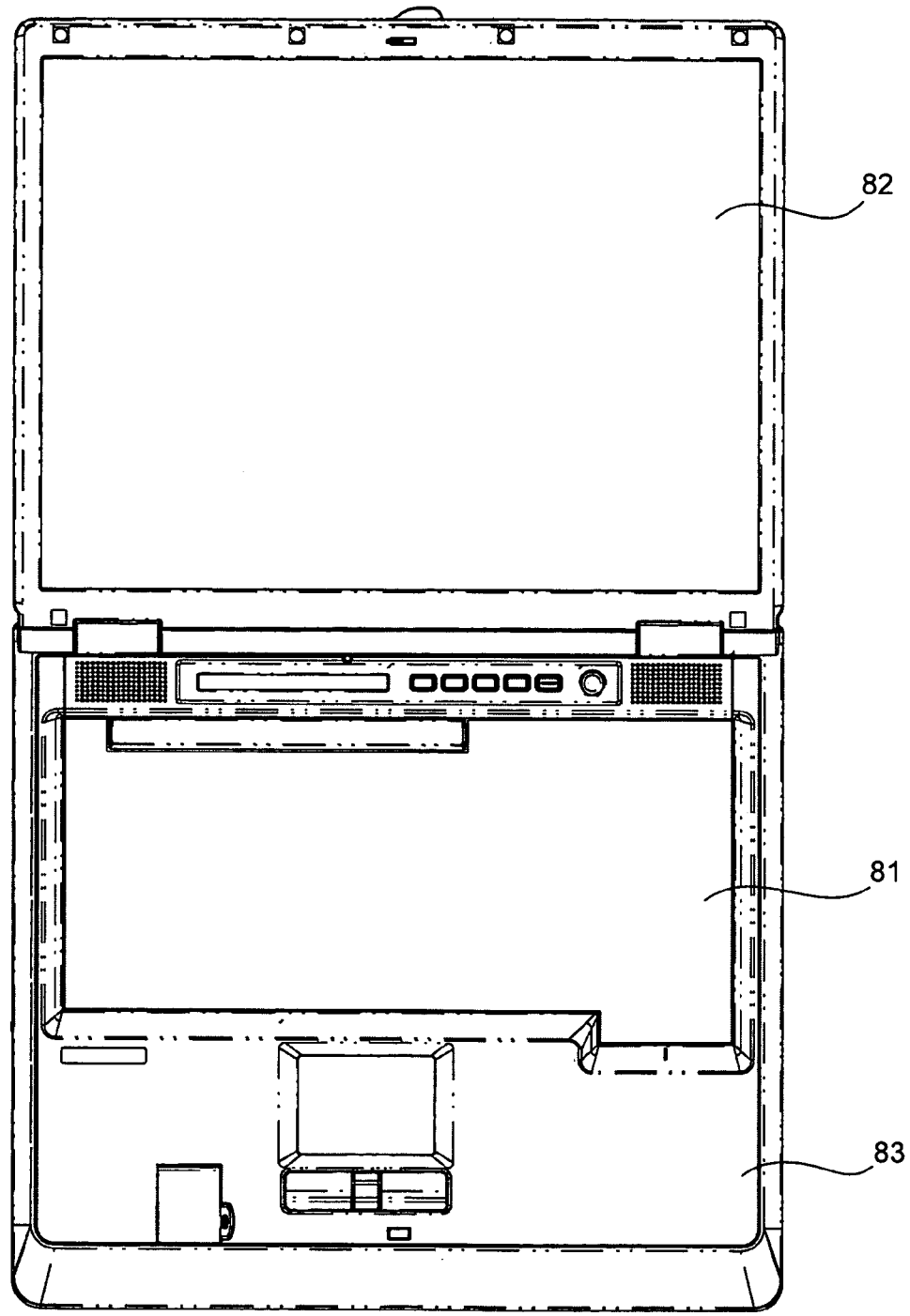
FIG. 2 is a plan view of a laptop computer that includes the integral unit.
Figure 3:
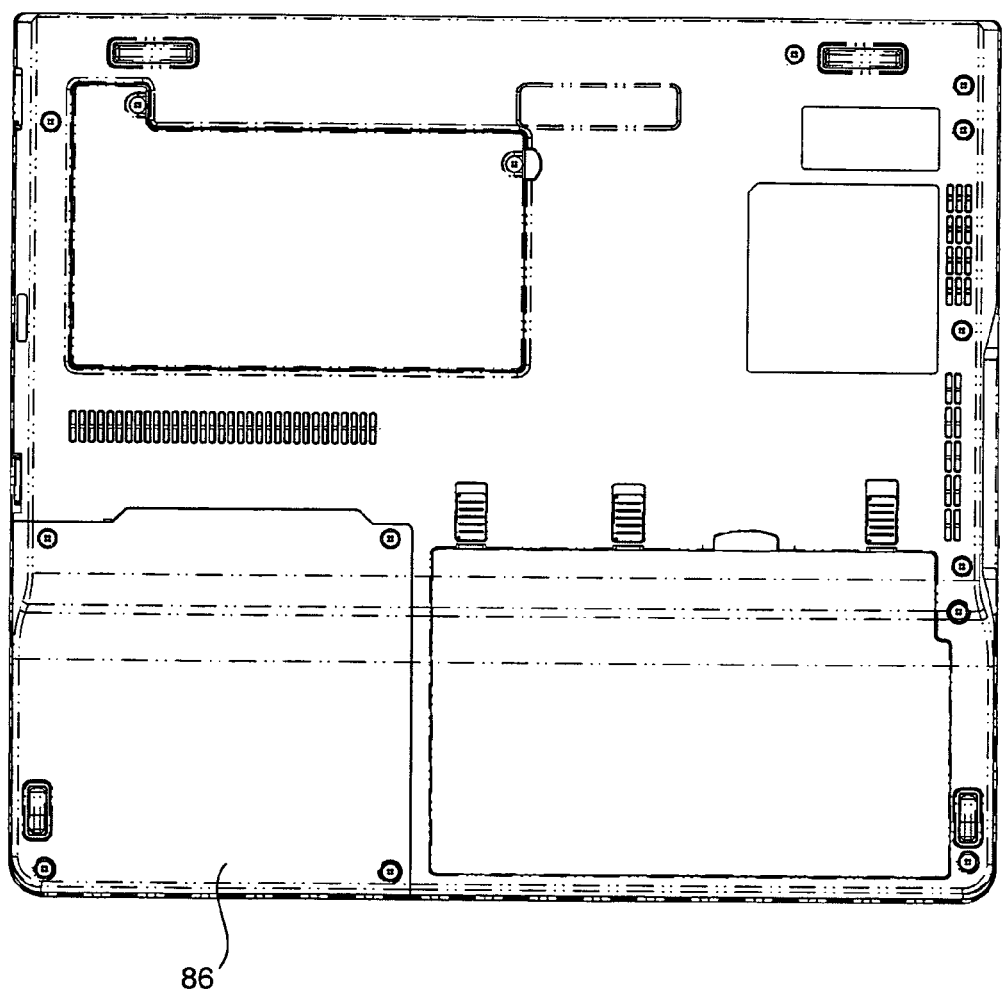
FIG. 3 is a bottom view of the laptop computer.
Figure 4:
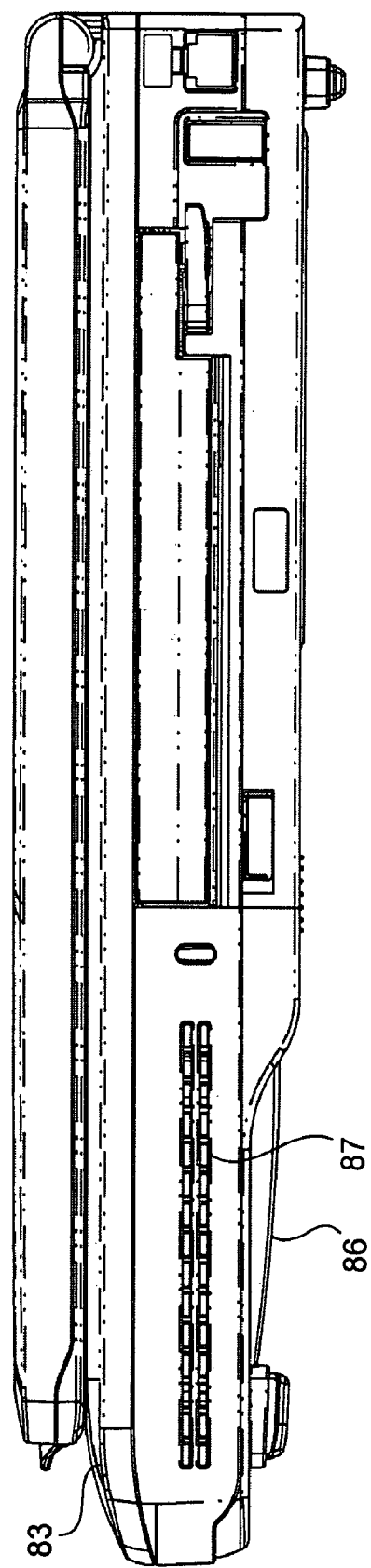
FIG. 4 is a side view of the laptop computer.

FIG. 1 is an exploded perspective view of an integral unit 100 of an HDD for RAID according to an embodiment of the present invention. FIG. 2 is a plan view of a laptop computer 80 that includes the integral unit 100. FIG. 3 is a bottom view of the laptop computer 80. FIG. 4 is a side view of the laptop computer 80.

As shown in FIG. 1, the integral unit 100 integrates a first HDD 10 as a first storage device, a second HDD 20 as a second storage device, and a control board 30 for the first HDD 10 and the second HDD 20. The integral unit 100 is mounted in a unit mounting section 84 in a main body of the laptop computer 80.

As shown in FIG. 1, major configuration of the apparatus for mounting includes a buffer fixing piece 40, a holding frame (a first holding unit) 50, a buffer fixing piece 60, and a holding case (a second holding unit) 70. The buffer fixing piece 40 is to arrange buffers 44, 45, 46 for the first HDD (refer to FIGS. 6 to 8). The holding frame 50 holds the first HDD that is fixed to the buffer fixing piece 40. The control board 30 is fixed to the holding frame 50. The buffer fixing piece 60 is to arrange buffer 64 for the second HDD, and to arrange the integral unit 100 so as to keep a distance from a palm rest 83 by fitting to a step 85 prepared in the unit mounting section 84. The holding case 70 holds the second HDD 20 that is fixed to the buffer fixing piece 60, and is connected to the holding frame 50.

The buffers 44, 45, 46, 64 and buffers 59, 79 that are described later are formed with an elastic material, such as rubber, that is shock absorbent.

As shown in FIGS. 2 to 4, the laptop computer 80 includes a keyboard 81, a liquid crystal display 82, and the palm rest 83. Among the above three parts, the external magnetic field most influences the laptop computer 80 through the palm rest 83.

The unit mounting section 84 in which the integral unit 100 is to be installed is arranged below the palm rest 83. Wrists of the user rest on the palm rest 83 when the user uses the keyboard 81. A magnetic field (external magnetic field) is generated, for example, by a magnet ring or a magnet bracelet wore by the user. Therefore, the components near the palm rest 83 have more chance of receiving a strong external magnetic field than other parts.

A rear lid 86 is attached after the integral unit 100 is installed in the unit mounting section 84. As shown in FIG. 4, air vents 87 are prepared in the case of the laptop computer 80 near the integral unit 100 installed inside, besides regular air vents, which are usually prepared for a laptop computer to dissipate heat, to enhance the dissipation.

The apparatus for mounting the first HDD 10 and the control board 30 is explained in detail with reference to FIGS. 5 to 15.

Figure 5:
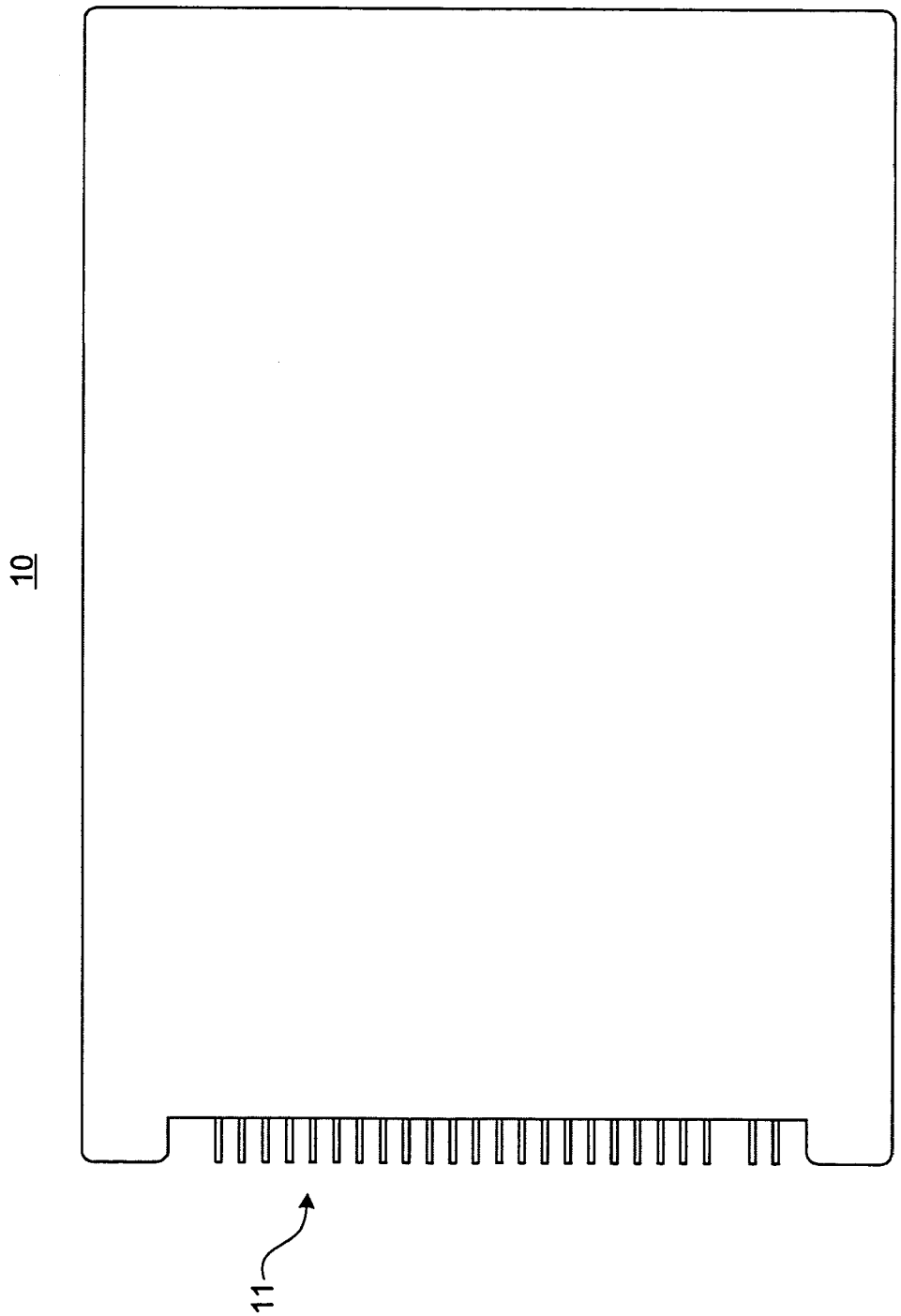
FIG. 5 is a plan view of a first HDD.
Figure 6:
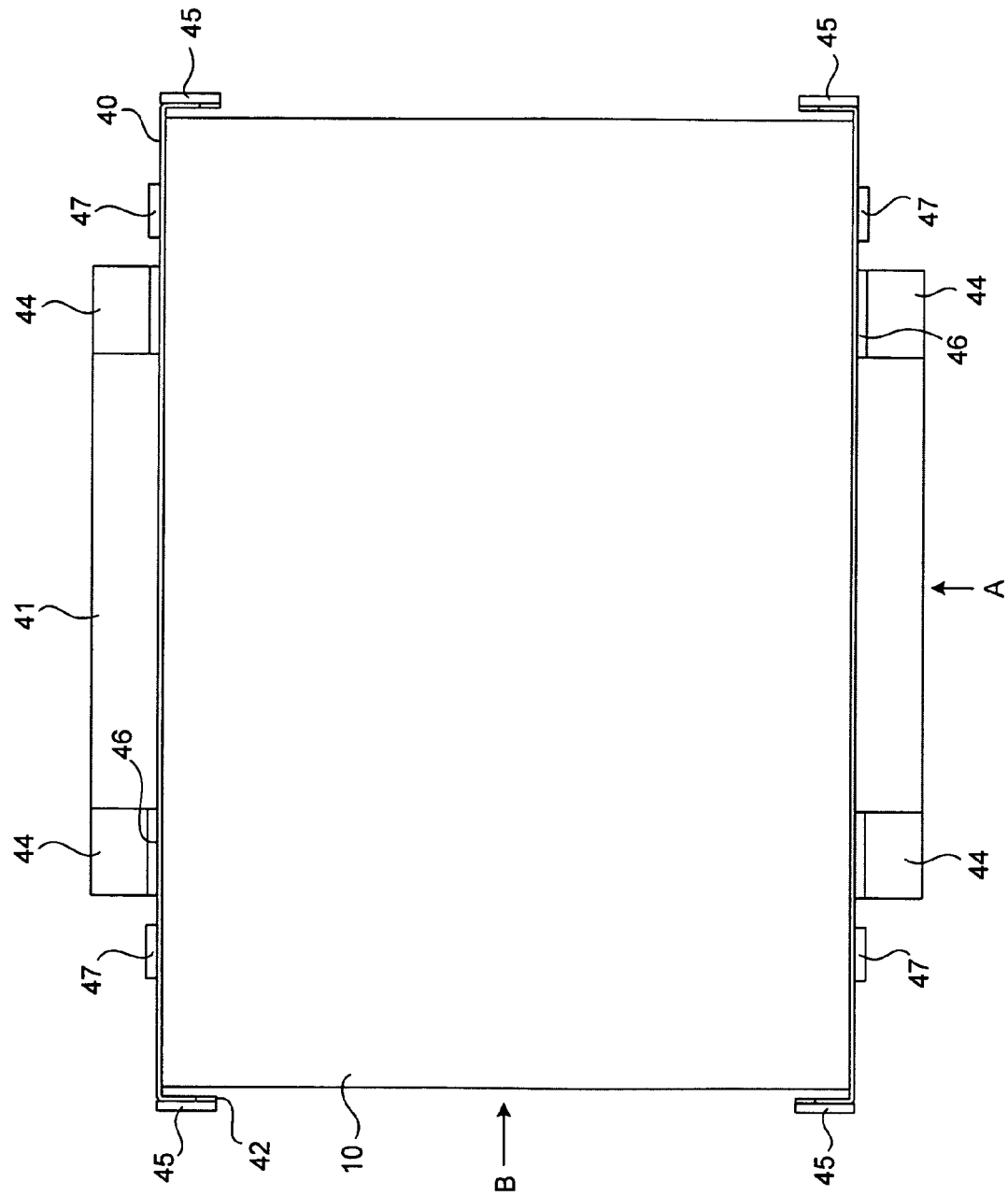
FIG. 6 is a plan view of the first HDD, which is shown in FIG. 1, with a buffer fixing piece installed.
Figure 7:
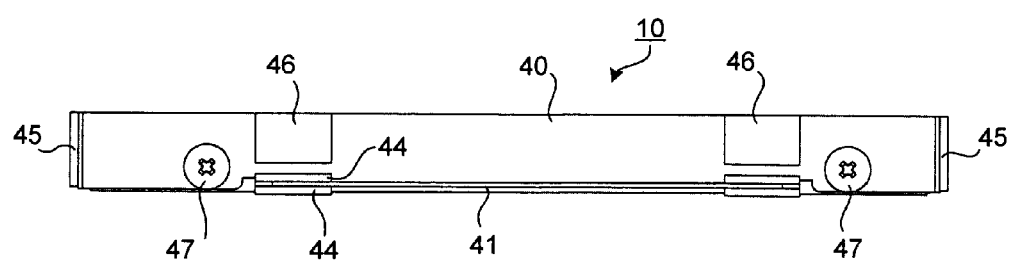
FIG. 7 is a side view of the first HDD as seen from a direction A shown in FIG. 6.
Figure 8:
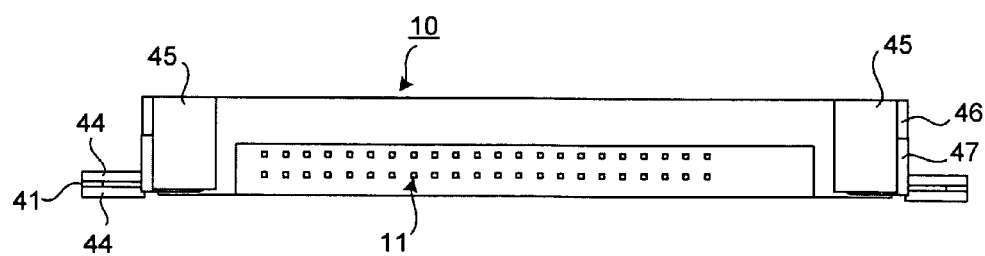
FIG. 8 is a side view of the first HDD as seen from a direction B shown in FIG. 6.

FIG. 5 is a plan view of the first HDD 10. FIG. 6 is a plan view of the first HDD 10 with a buffer fixing piece 40 installed. FIG. 7 is a side view of the first HDD 10 as seen from a direction A shown in FIG. 6. FIG. 8 is a side view of the first HDD 10 as seen from a direction B shown in FIG. 6.

Figure 9:
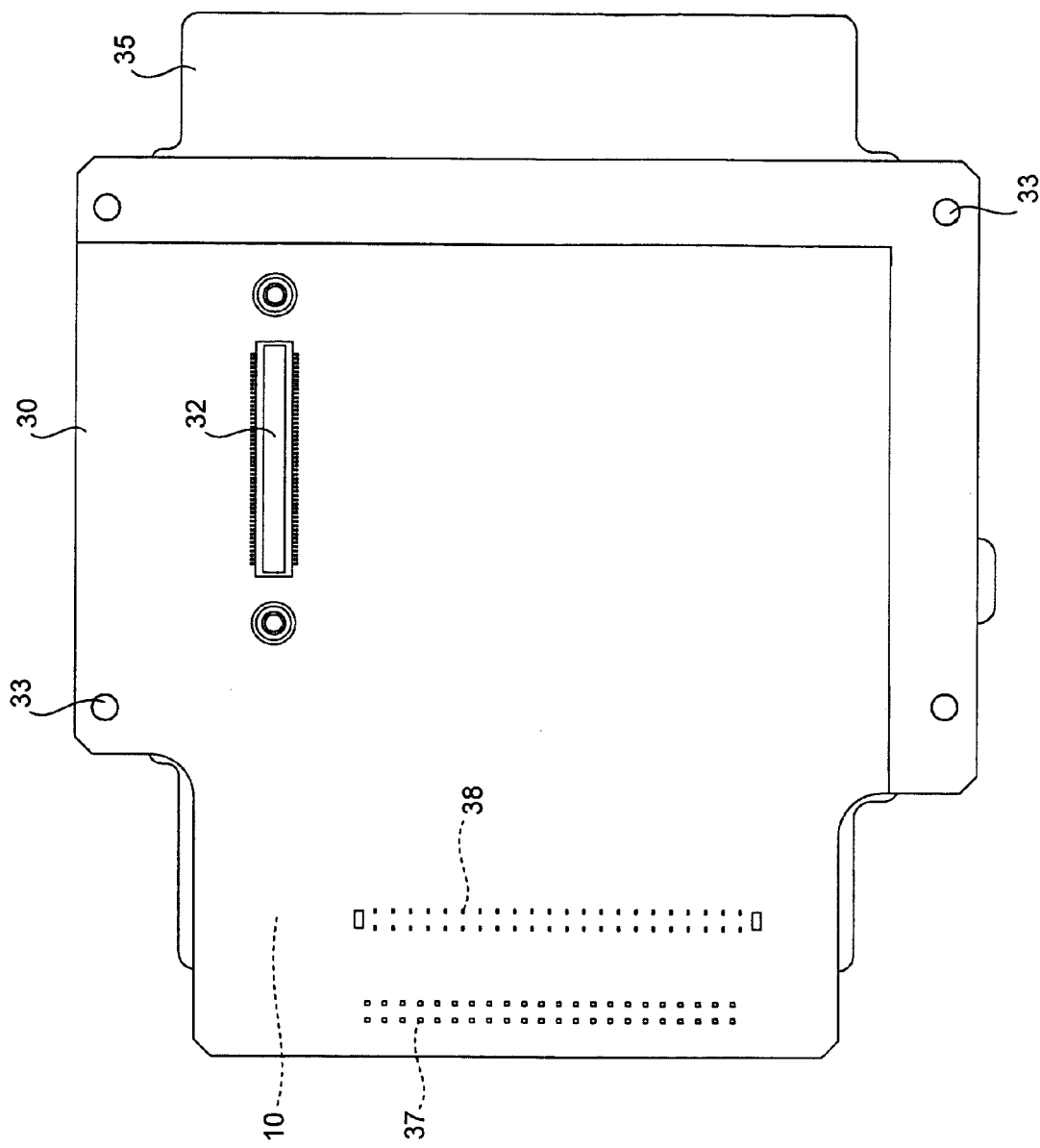
FIG. 9 is a rear view of the first HDD to which a control board is fixed.
Figure 10:
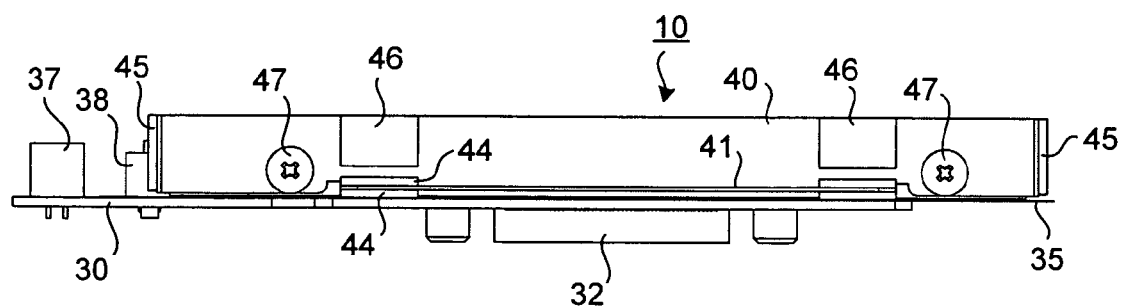
FIG. 10 is a side view of the first HDD as seen from a direction C shown in FIG. 9.
Figure 11:
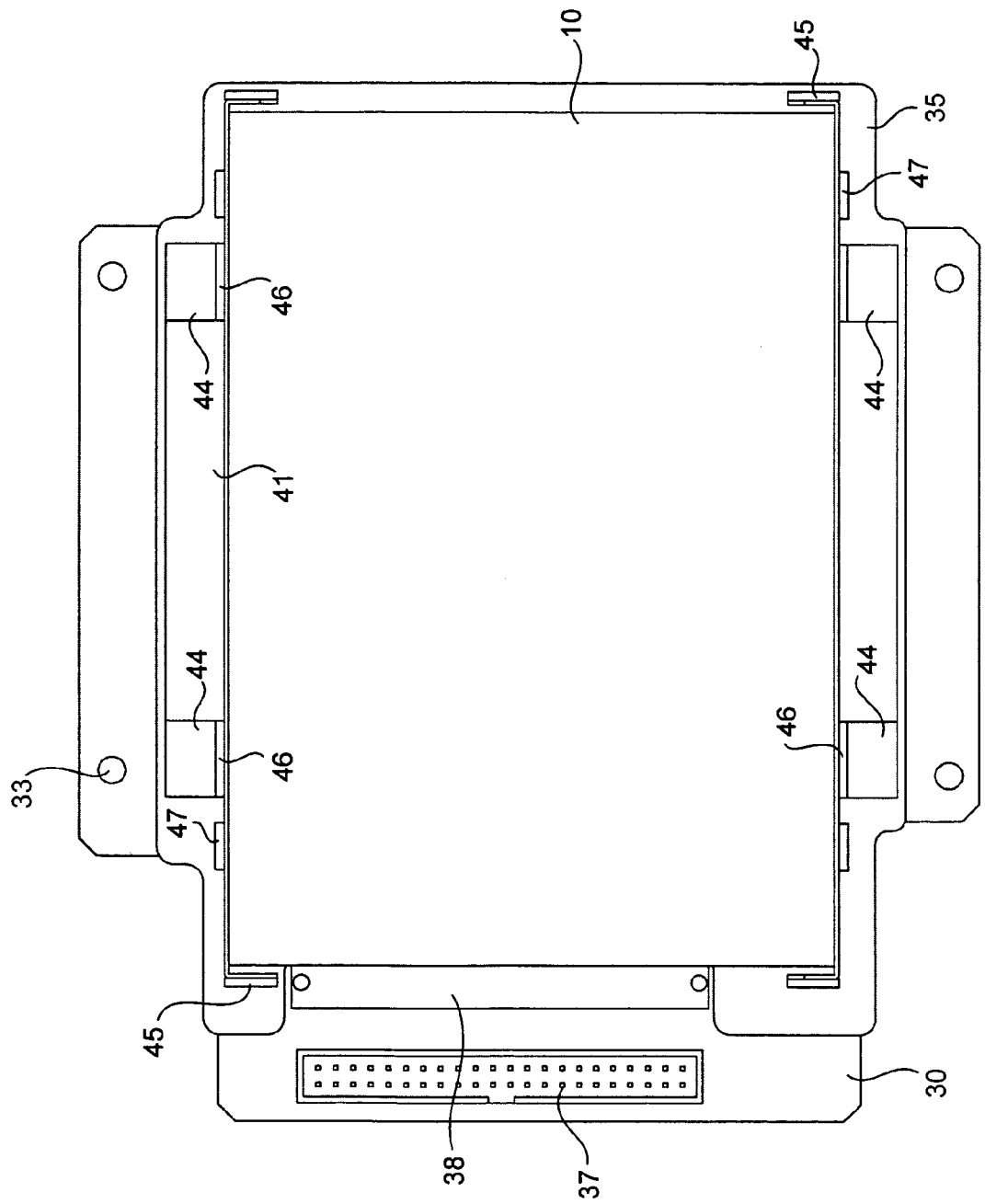
FIG. 11 is a front view of the first HDD to which the control board is fixed.

FIG. 9 is a rear view of the first HDD 10 to which a control board 30 is fixed. FIG. 10 is a side view of the first HDD 10 as seen from a direction C shown in FIG. 9. FIG. 11 is a front view of the first HDD 10 to which the control board 30 is fixed.

Figure 12:
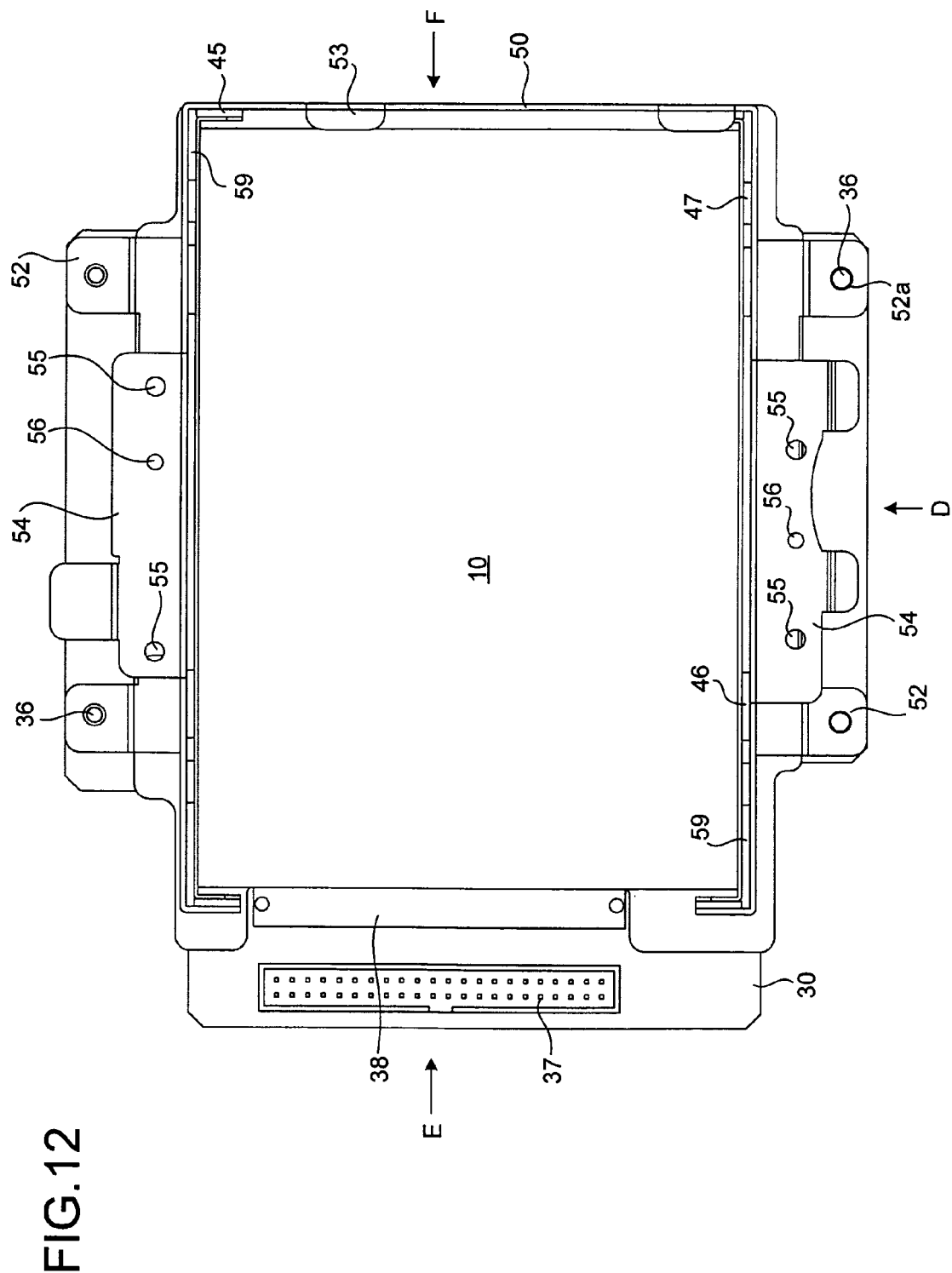
FIG. 12 is a front view of the first HDD to which the control board and a holding frame are fixed.
Figure 13:
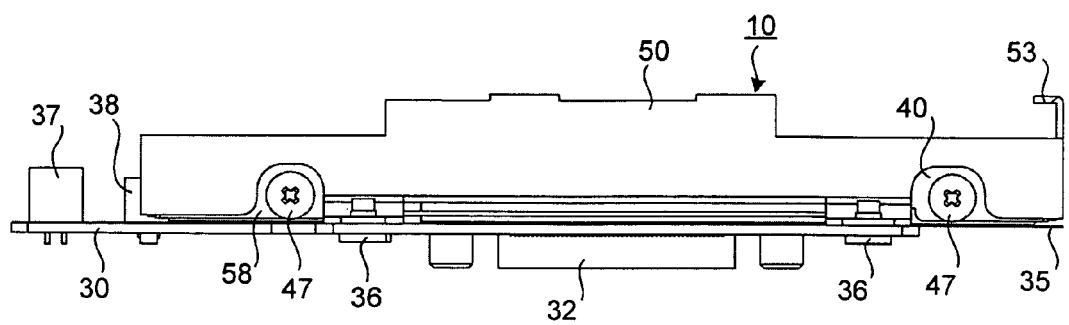
FIG. 13 is a side view of the first HDD as seen from a direction D shown in FIG. 12.
Figure 14:
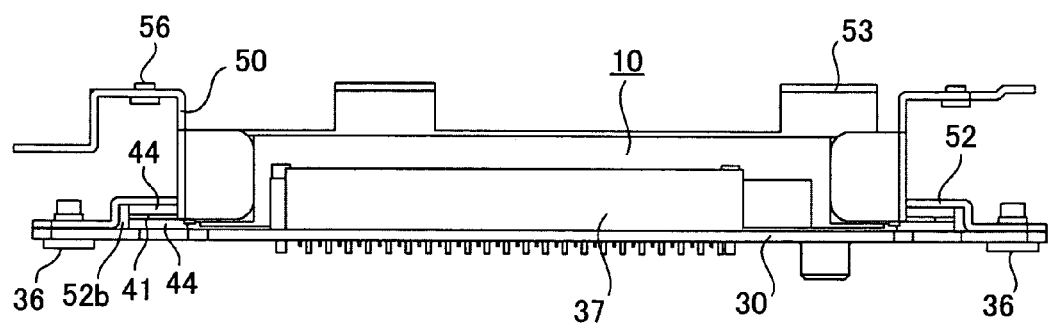
FIG. 14 is a side view of the first HDD as seen from a direction E shown in FIG. 12.
Figure 15:
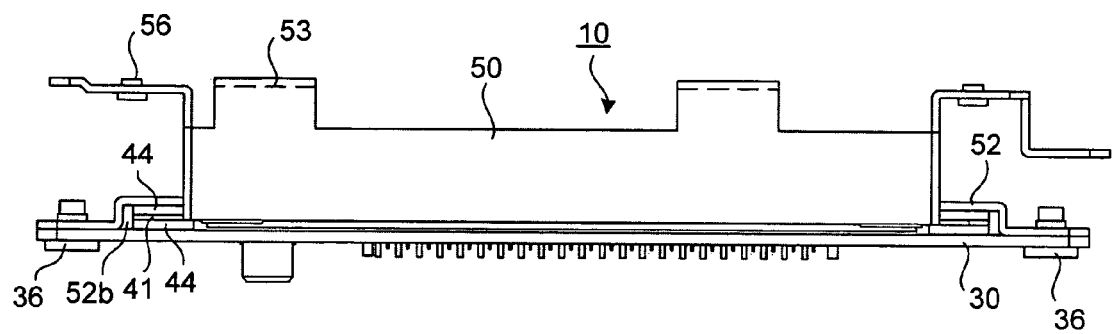
FIG. 15 is a side view of the first HDD as seen from a direction F shown in FIG. 12.

FIG. 12 is a front view of the first HDD 10 to which the control board 30 and a holding frame 50 are fixed. FIG. 13 is a side view of the first HDD 10 as seen from a direction D shown in FIG. 12. FIG. 14 is a side view of the first HDD 10 as seen from a direction E shown in FIG. 12. FIG. 15 is a side view of the first HDD 10 as seen from a direction F shown in FIG. 12.

As shown in FIGS. 5 to 8, the buffer fixing piece 40 that is formed with a metallic plate such as of stainless steel includes a lateral brim 41 for arranging the buffer 44 on each side, and a bend 42 for arranging the buffer 45. The buffer fixing piece 40 is fixed to the first HDD 10 with screws 47 on both sides of the first HDD 10. The buffer 46 is arranged on the buffer fixing piece 40.

As shown in FIG. 1 and FIGS. 9 to 15, a terminal section 11 of the first HDD 10, which is integrated with the buffer fixing piece 40, is connected to a connector 38 of the control board 30. The first HDD 10 is held and fixed by the holding frame 50. An insulation sheet 35 is arranged between the first HDD 10 and the control board 30.

The control board 30, which is a control board for the first HDD 10 and the second HDD 20, includes a connector 32, a connector 37, and the connector 38. The connector 32 is to connect to a cable 89 (refer to FIG. 28) in a circuit inside the laptop computer 80. The connector 37 is to connect to a flat cable 39. The connector 38 is to connect to the first HDD 10. The control board 30 includes a hole 33 to put a screw 36 in.

The holding frame 50 is substantially square shaped with one side open as shown in FIG. 1. The holding frame 50 includes a fixing projection piece 52, a supporting piece 53, and a connecting brim 54. The fixing projection piece 52 includes a screw hole 52a for fixing the control board 30 with the screw 36. The fixing projection piece 52 includes a concave section 52b to which the buffer 44 of the buffer fixing piece 40 fits.

The connecting brim 54 includes a screw hole 55 for connecting to a connecting brim 74 in the holding case 70 with a screw 57. The connecting brim 54 includes a dowel 56, and the connecting brim 74 includes a slit 77 in which the dowel 56 fits. When the connecting brim 54 and the connecting brim 74 are connected to each other, the connecting position is easily determined by fitting the dowel 56 into the slit 77.

A notch 58 is prepared to facilitate screwing work with a screwdriver (not shown). The holding frame 50 includes the buffer 59 inside each of the four corners.

Figure 16:
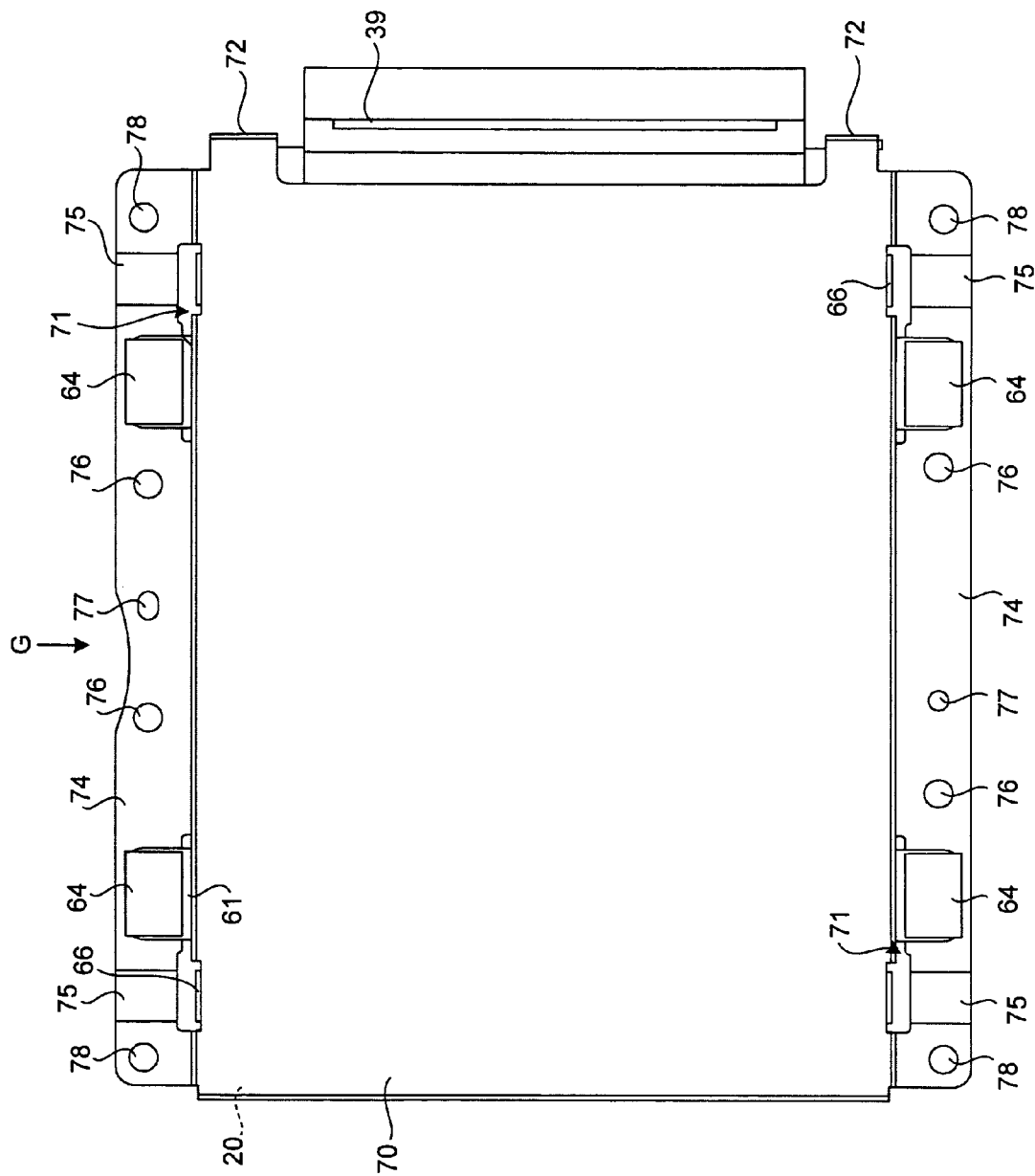
FIG. 16 is a bottom view of a second HDD, which is shown in FIG. 1, to which the buffer fixing piece is arranged, and that is held in a holding case.
Figure 17:
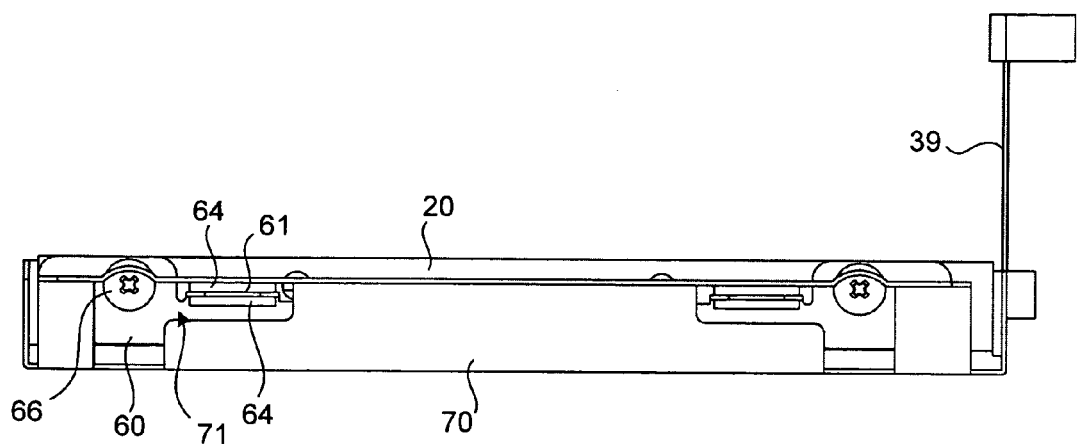
FIG. 17 is a side view of the second HDD as seen from a direction G shown in FIG. 16.

The apparatus for mounting the second HDD 20 is explained in detail with reference to FIGS. 16 to 20. FIG. 16 is a bottom view of the second HDD 20 to which the buffer fixing piece 60 is arranged, and that is held in the holding case 70. FIG. 17 is a side view of the second HDD 20 as seen from a direction G shown in FIG. 16.

Figure 18:
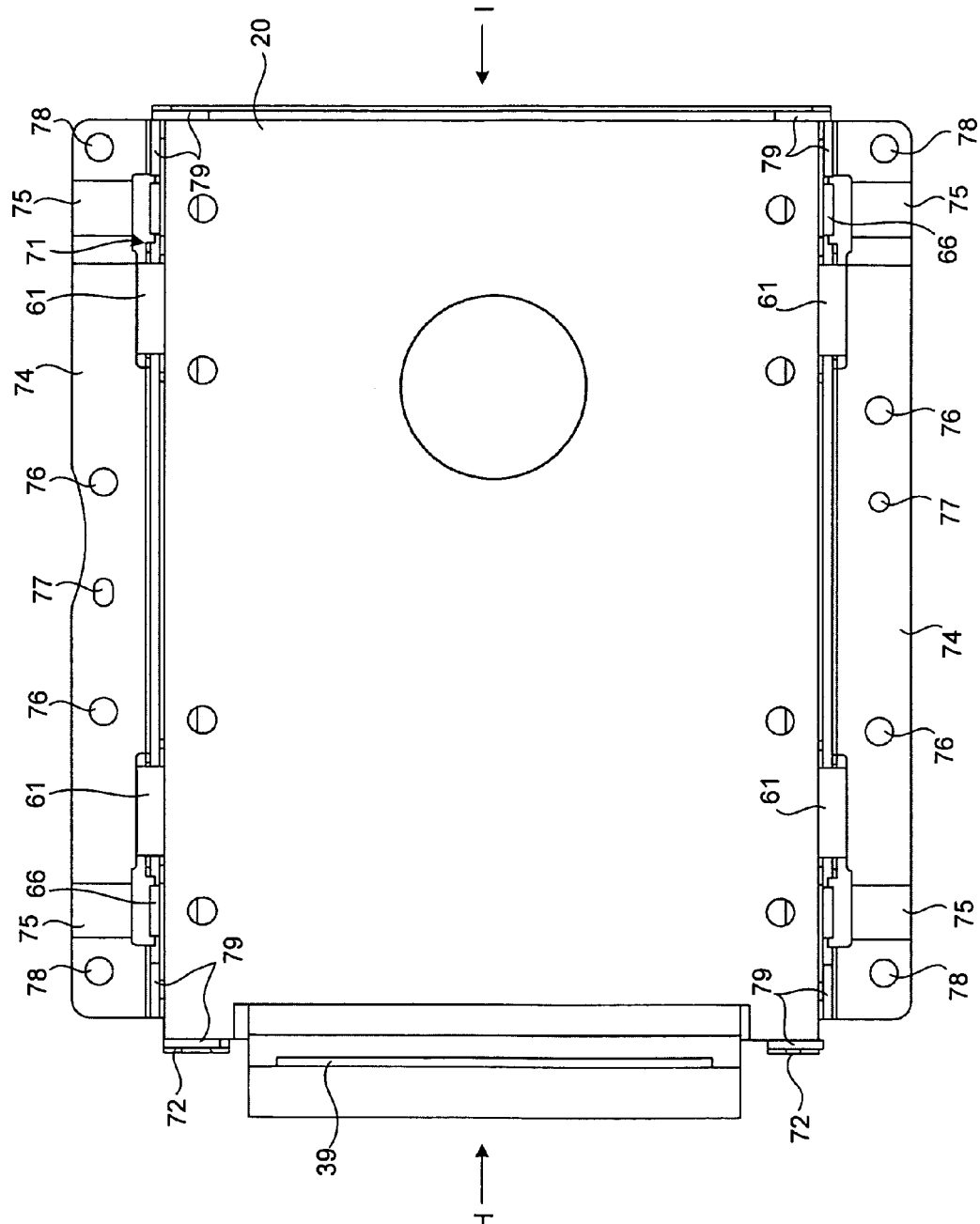
FIG. 18 is a front view of the second HDD shown in FIG. 16.
Figure 19:
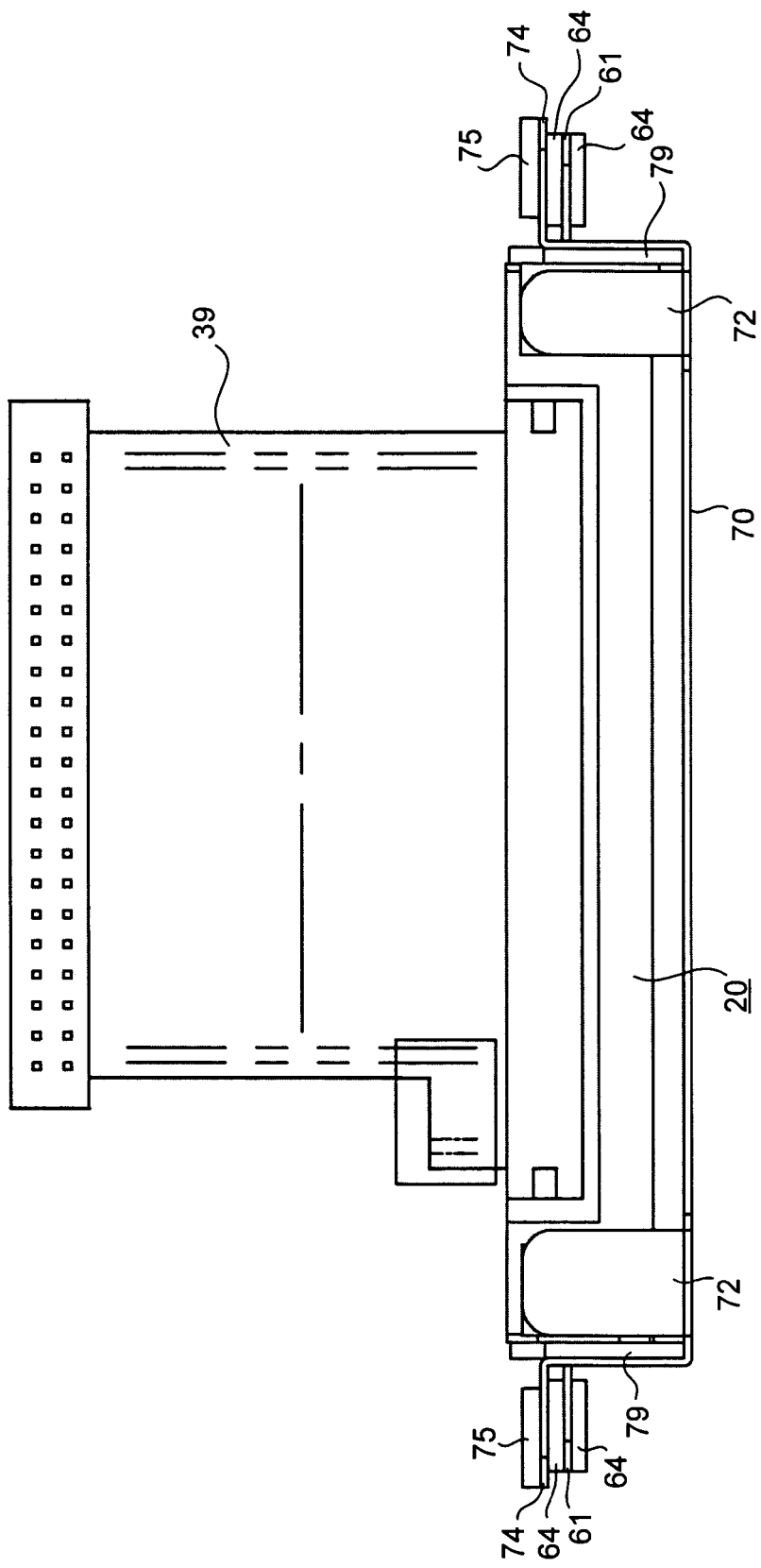
FIG. 19 is a side view of the second HDD as seen from a direction H shown in FIG. 16.
Figure 20:
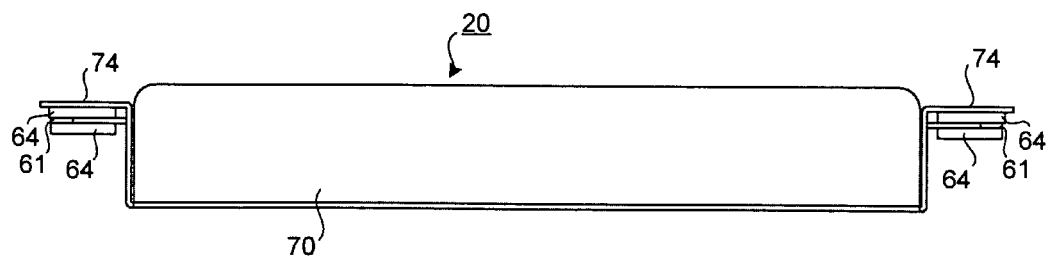
FIG. 20 is a side view of the second HDD as seen from a direction I shown in FIG. 16.

FIG. 18 is a front view of the second HDD 20 shown in FIG. 16. FIG. 19 is a side view of the second HDD 20 as seen from a direction H shown in FIG. 16. FIG. 20 is a side view of the second HDD 20 as seen from a direction I shown in FIG. 16.

Components of the second HDD 20 are same as the components of the first HDD 10. The flat cable 39 is connected to a terminal section 21 (refer to FIG. 1) of the second HDD 20. A screw hole 22 is arranged at a standard position (SFF: Small Form Factor) in the second HDD 20. In the embodiment, the screw hole 22 is for fixing the buffer fixing piece 60 with a screw 66.

As shown in FIGS. 1, 16, and 17, the buffer fixing piece 60 that is formed with a metallic plate such as of stainless steel includes a lateral brim 61 for arranging the buffer 64, and a screw hole 62 in which the screw 66 is put. The buffer fixing piece 60 is fixed to the second HDD 20 with screws on both sides of the second HDD 20.

The holding case 70 is explained next. As shown in FIG. 1, the holding case 70 that is formed with a metallic plate such as of stainless steel is a box-shaped case with a bottom plate, leaving one side and a top side open. A hole 71 that is arranged in the holding case 70. The hole 71 provides a space for the screw 66 to be inserted, and a space for the buffer 64, which is arranged in the buffer fixing piece 60, to be able to move within a predetermined distance S (refer to FIGS. 26 and 27).

The screw 66 is a flat head screw. A stopper 72 limits sliding of the second HDD 20 to prevent the second HDD 20 from falling out of the holding case 70.

The connecting brim 74 horizontally stretches out from the upper edge on each side of the holding case 70 as shown in FIG. 1. The connecting brim 74 includes a screw hole 74 for connecting to the connecting brim 54 of the holding frame 50 with the screw 57.

The connecting brim 74 includes the slit 77 to which the dowel 56 in the connecting brim 54 fits so that the screw hole 76 and the screw hole 55 in the connecting brim 54 can be positioned properly. A screw hole 78 is prepared in the connecting brim 74. In the screw hole 78, a screw 88 is inserted through when the integral unit 100 is to be fixed to the main body of the laptop computer 80. In other words, first, the holding case 70 is installed in the unit mounting section 84. Then, the screw 88, which is inserted through the screw hole 78, is screwed into the screw hole 85a in the unit mounting section 84 to fix the holding case 70 to the main body of the laptop computer 80. Thus, the integral unit 100 is fixed to the main body of the laptop computer 80 in the unit mounting section 84.

A screw draft 75 is arranged so that the screw 66 does not interfere with the connecting brim 74 when the buffer fixing piece 60 is connected to the second HDD 20 with the screw 66, or is disconnected from the second HDD 20. The screw hole 22 in the second HDD 20 is in the standard position; therefore, the position of the screw hole 22 is not changeable. On the other hand, the hole 71 can be formed larger in direction of height to avoid the above interference.

However, this makes the holding case 70 larger in height. It is not suitable for the laptop computer 80 that needs to be assembled densely to be compact and lightweight. Therefore, to avoid the interference between the screw 66 and the connecting brim 74 without sacrificing the compact size, the screw draft 75 is formed by bending the corresponding part in the connecting brim 74 to be upward convex. This enlarges the hole 71 (refer to FIG. 1), and enables to easily avoid the interference between the screw 66 and the connecting brim 74 without sacrificing the compact size.

Figure 28:
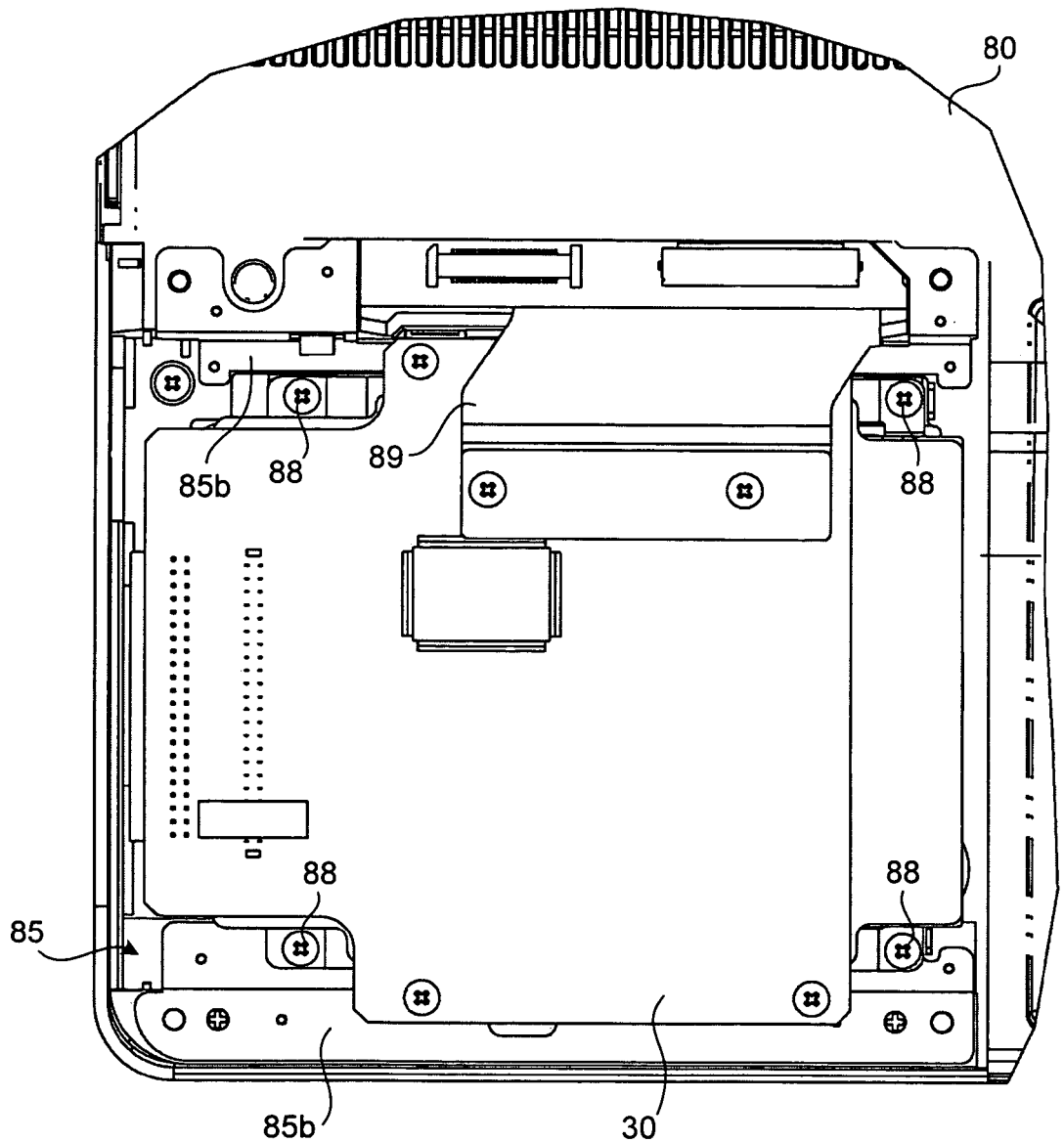
FIG. 28 is a front view of a part of the integral unit shown in FIG. 27.
Figure 29:
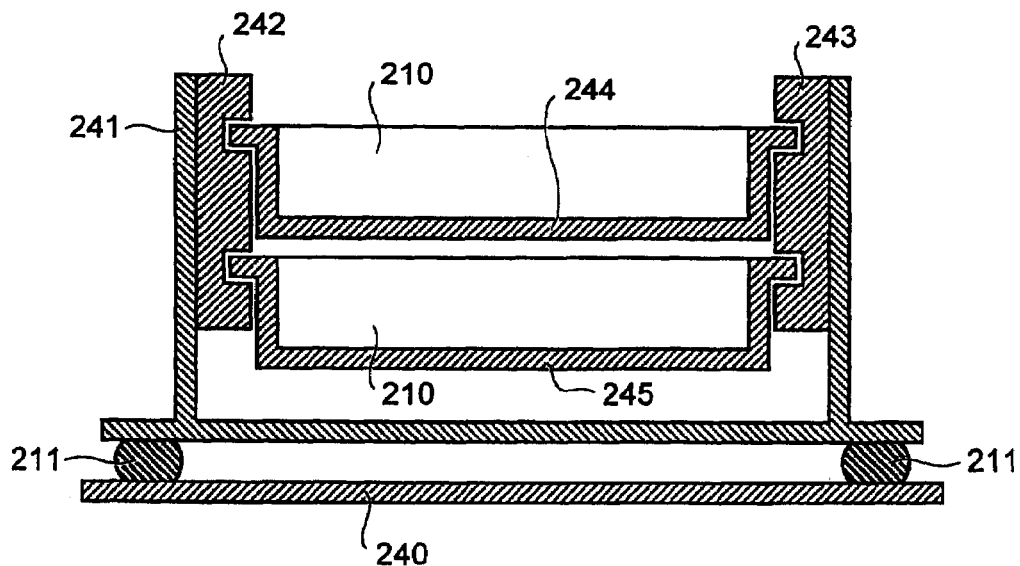
FIG. 29 is a front cross-section of a vibration isolation structure for an electronic device according to a conventional technology.
Figure 30:
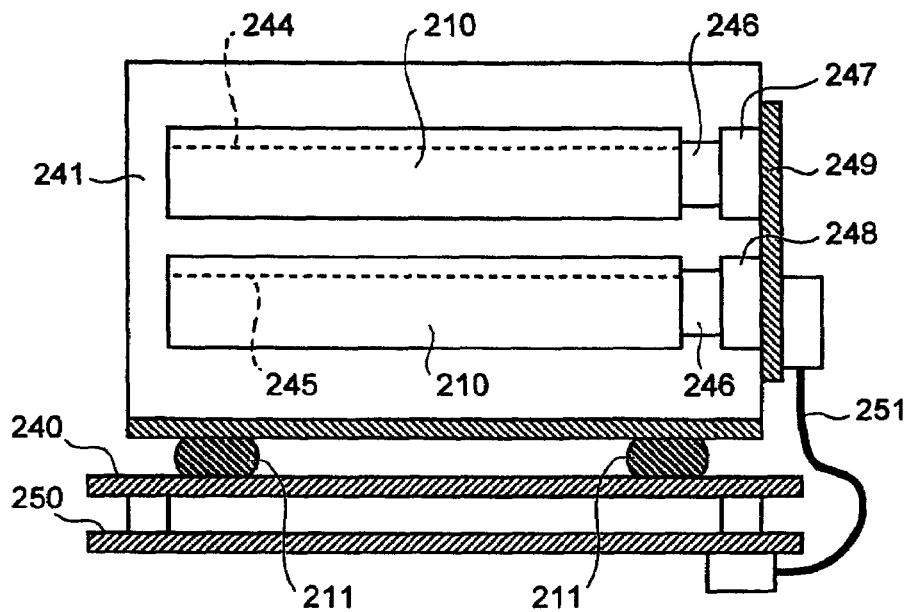
FIG. 30 is a side cross-section of the vibration isolation structure shown in FIG. 29.

The holding case 70 includes the buffer 79 inside each of the four corners. As shown in FIG. 28, the laptop computer 80 includes a rail 85b that is of a metal such as phosphor bronze and aluminum at the step 85. The rail 85b is to electrically connect with the holding case 70 to establish a ground.

Convex and concave parts are formed on the surface of the rail 85b for easy positioning for the screw hole 78 and the screw hole 85a. FIG. 28 is a front view of a part of the integral unit 100 that is installed in the mounting section 84 in the laptop computer 80.

Figure 21:
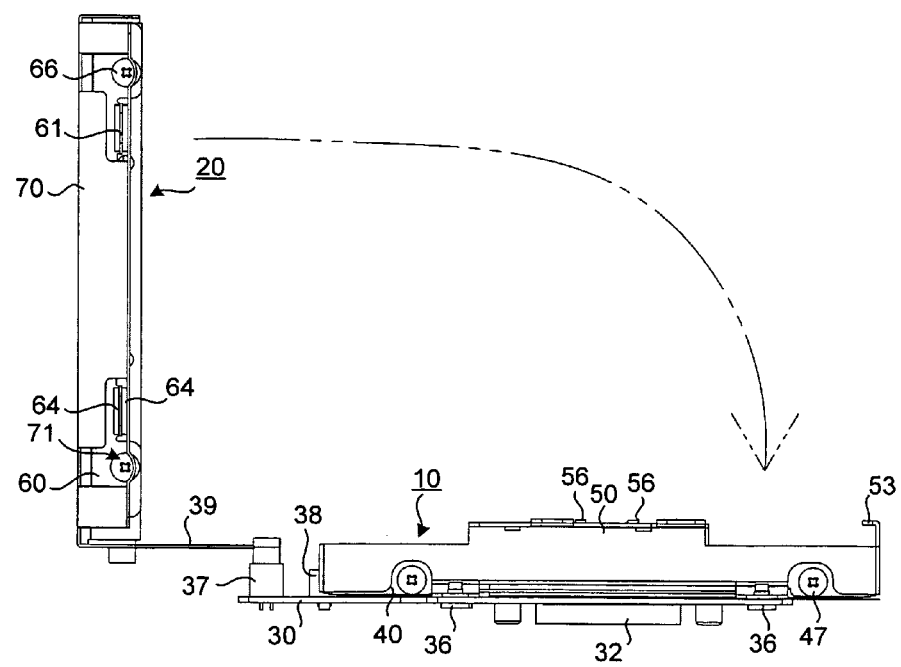
FIG. 21 is a diagram for explaining integration of the first HDD and the second HDD that are connected to each other through a flat cable.
Figure 22:
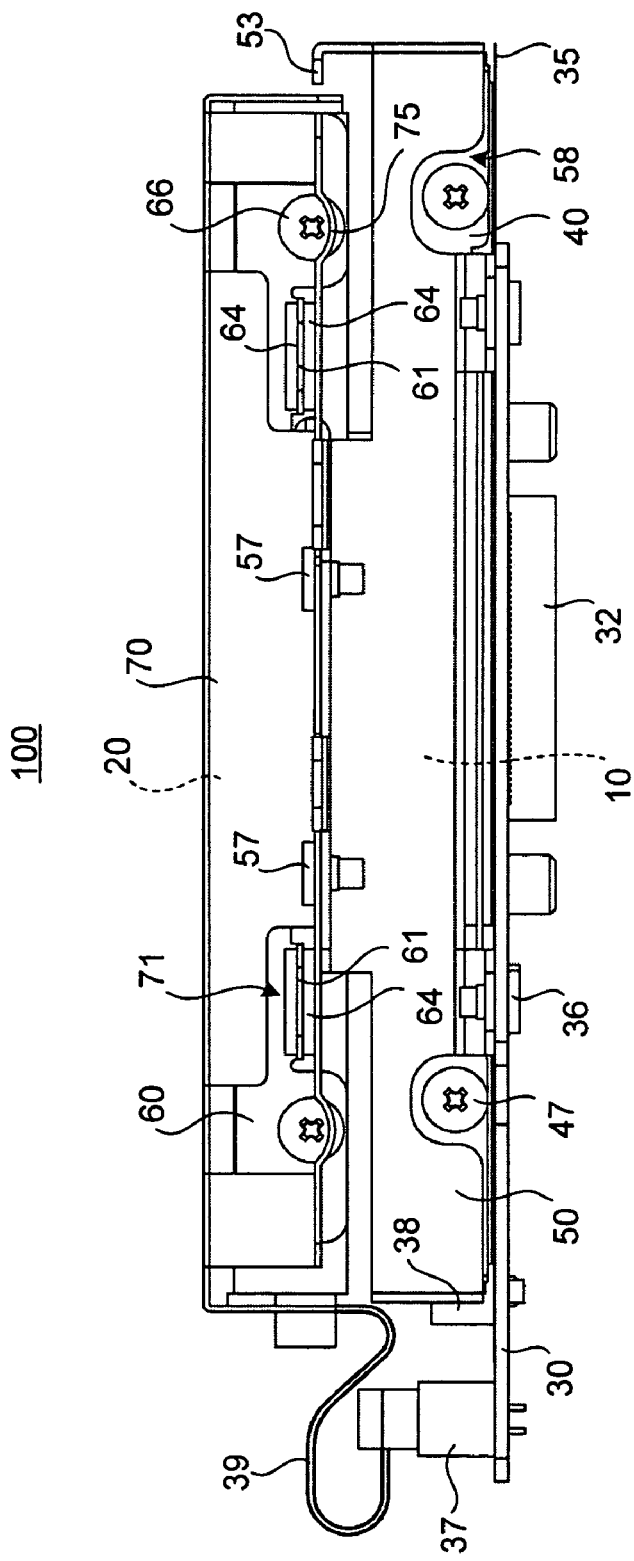
FIG. 22 is a side view of the integral unit.
Figure 23:
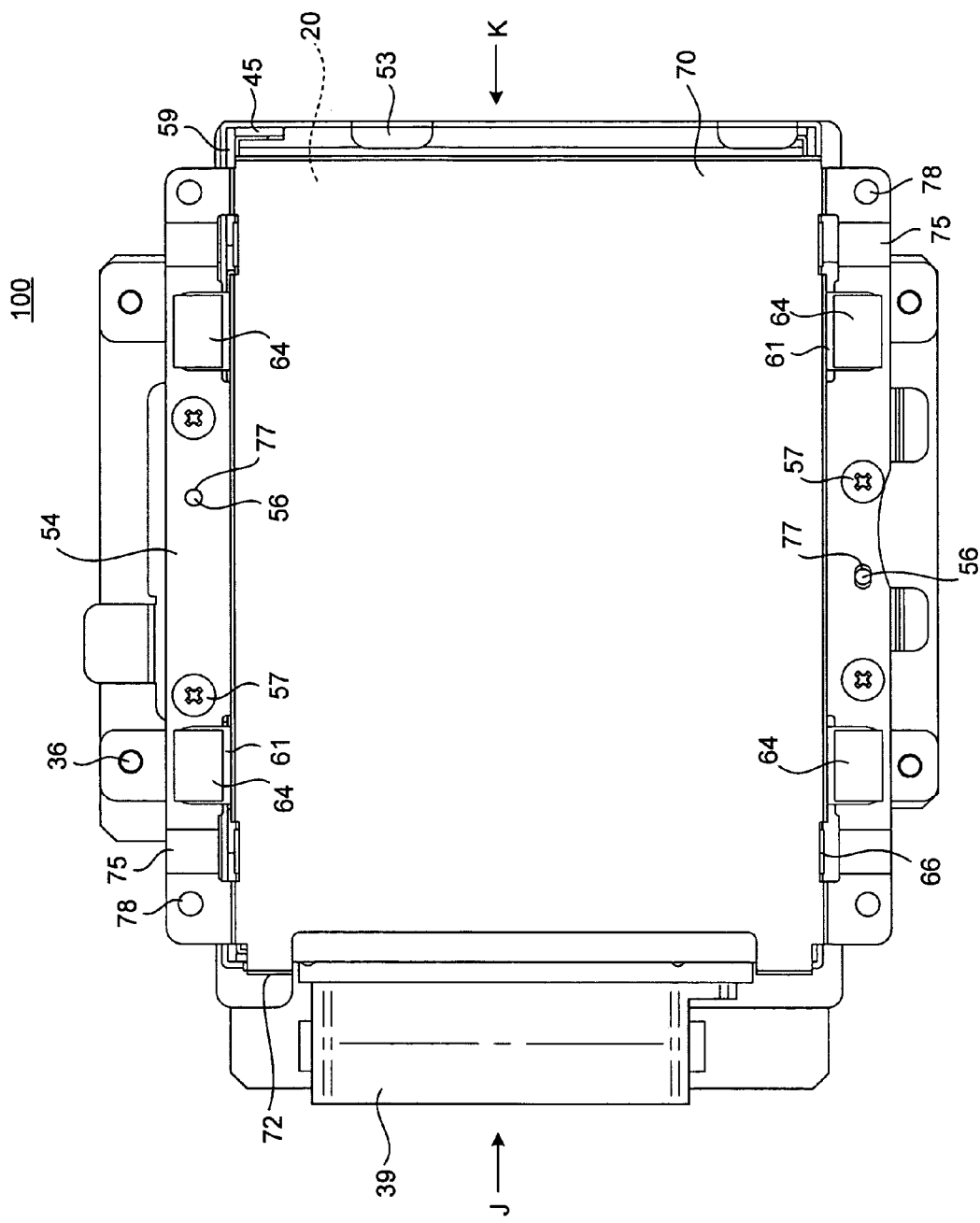
FIG. 23 is a bottom view of the integral unit.

The integral unit 100 is explained with reference to FIGS. 21 to 25. FIG. 21 is a diagram for explaining integration of the first HDD 10 and the second HDD 20 that are connected to each other through the flat cable 39. FIG. 22 is a side view of the integral unit 100. FIG. 23 is a bottom view of the integral unit 100.

Figure 24:
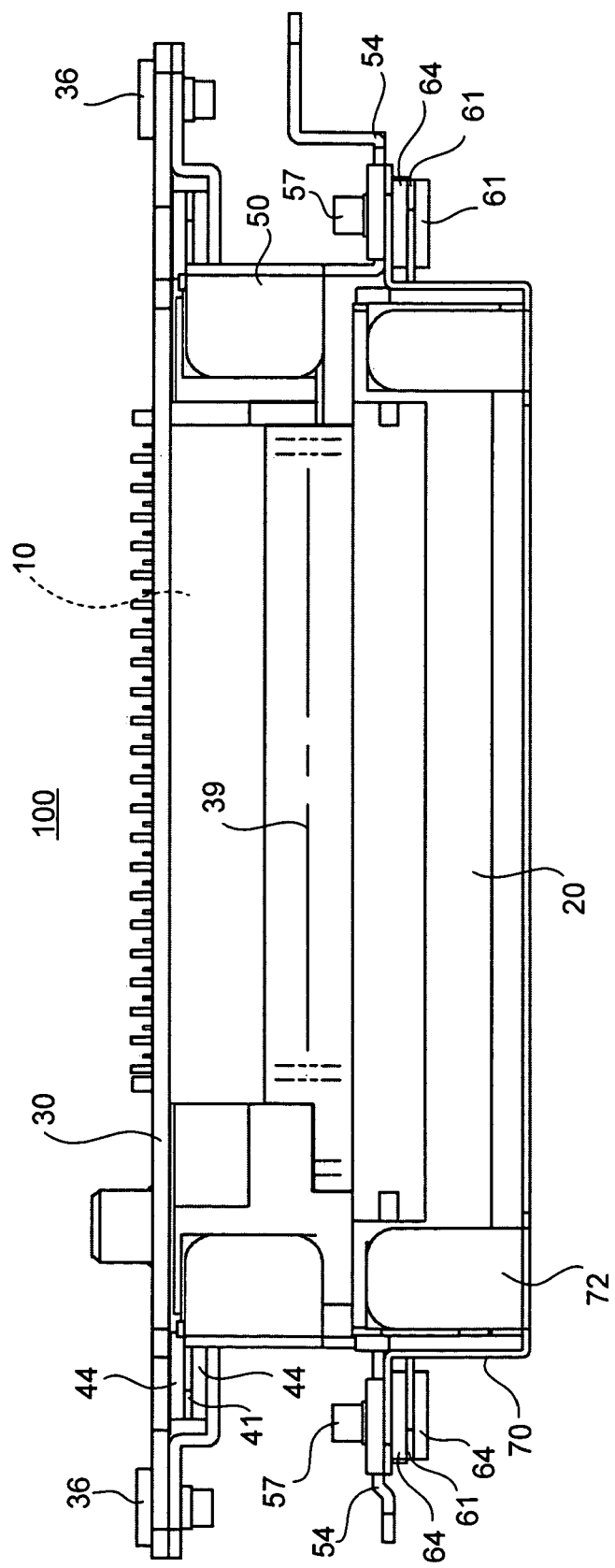
FIG. 24 is a side view of the integral unit as seen from a direction J shown in FIG. 23.
Figure 25:
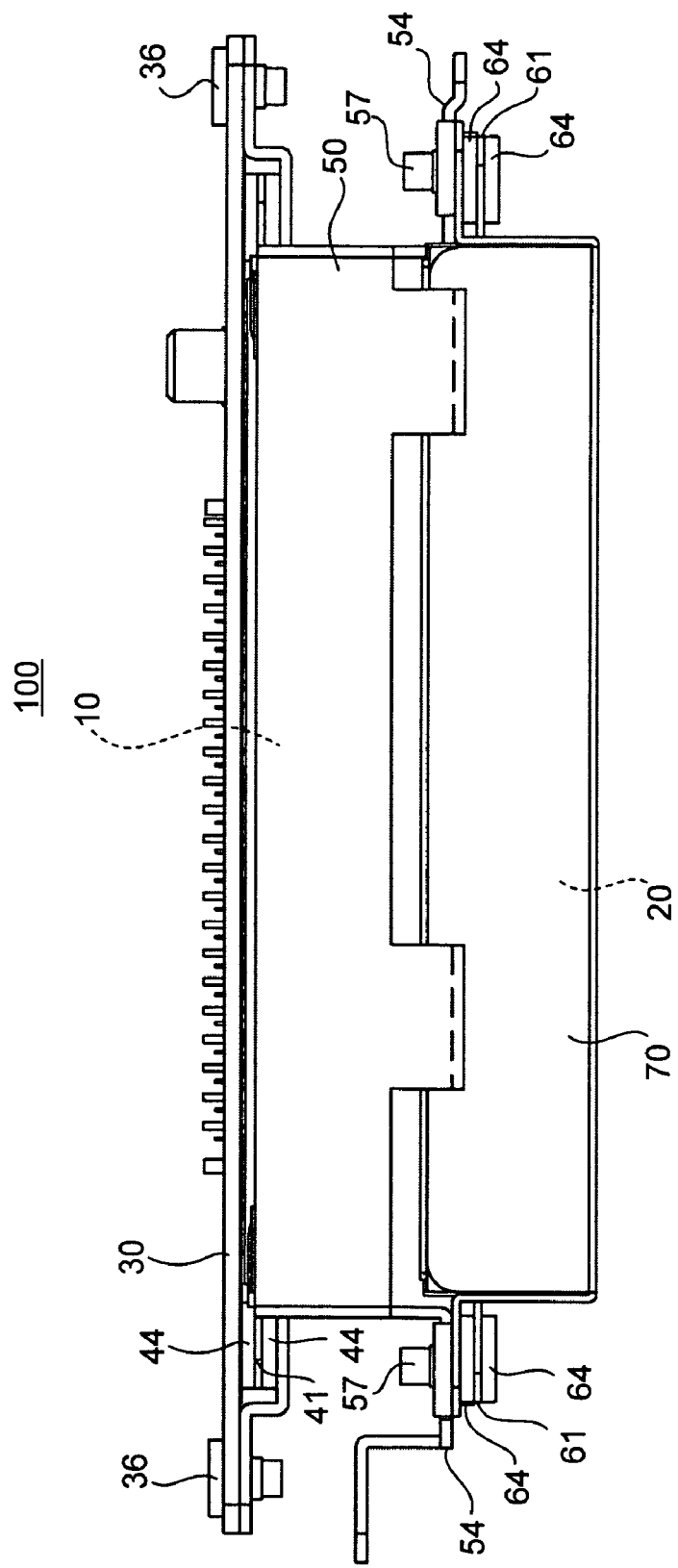
FIG. 25 is a side view of the integral unit as seen from a direction K shown in FIG. 23.

FIG. 24 is a side view of the integral unit 100 as seen from a direction J shown in FIG. 23. FIG. 25 is a side view of the integral unit 100 as seen from a direction K shown in FIG. 23.

As shown in FIG. 21, the second HDD 20 and the control board 30 are electrically connected to each other through the flat cable 39. Because the flat cable 39 is flexible, the holding case 70 can easily be brought close to the holding case 50, as explained with a phantom line in FIG. 21, even after the second HDD 20 and the control board 30 are connected to each other with the flat cable 39. This facilitates the connecting work of the second HDD 20 and the control board 30.

As shown in FIGS. 22 to 25, the integral unit 100 integrates the first HDD 10, the second HDD 20, and the control board 30 extremely compactly. Furthermore, the integral unit 100 is resistant to vibrations and shocks to a certain extent because the integral unit 100 includes the buffers 44, 45, 46, 59, 64, and 79. The integral unit can also eliminate influence of the external magnetic field to some extent by arranging the holding case 70 and other components that are made of metal.

Moreover, the integral unit 100 has a structure in which the influence of the external magnetic field can be further reduced when the integral unit 100 is installed in the unit mounting section 84 in the laptop computer 80. This effect is explained with reference to FIGS. 26 and 27.

Figure 26:
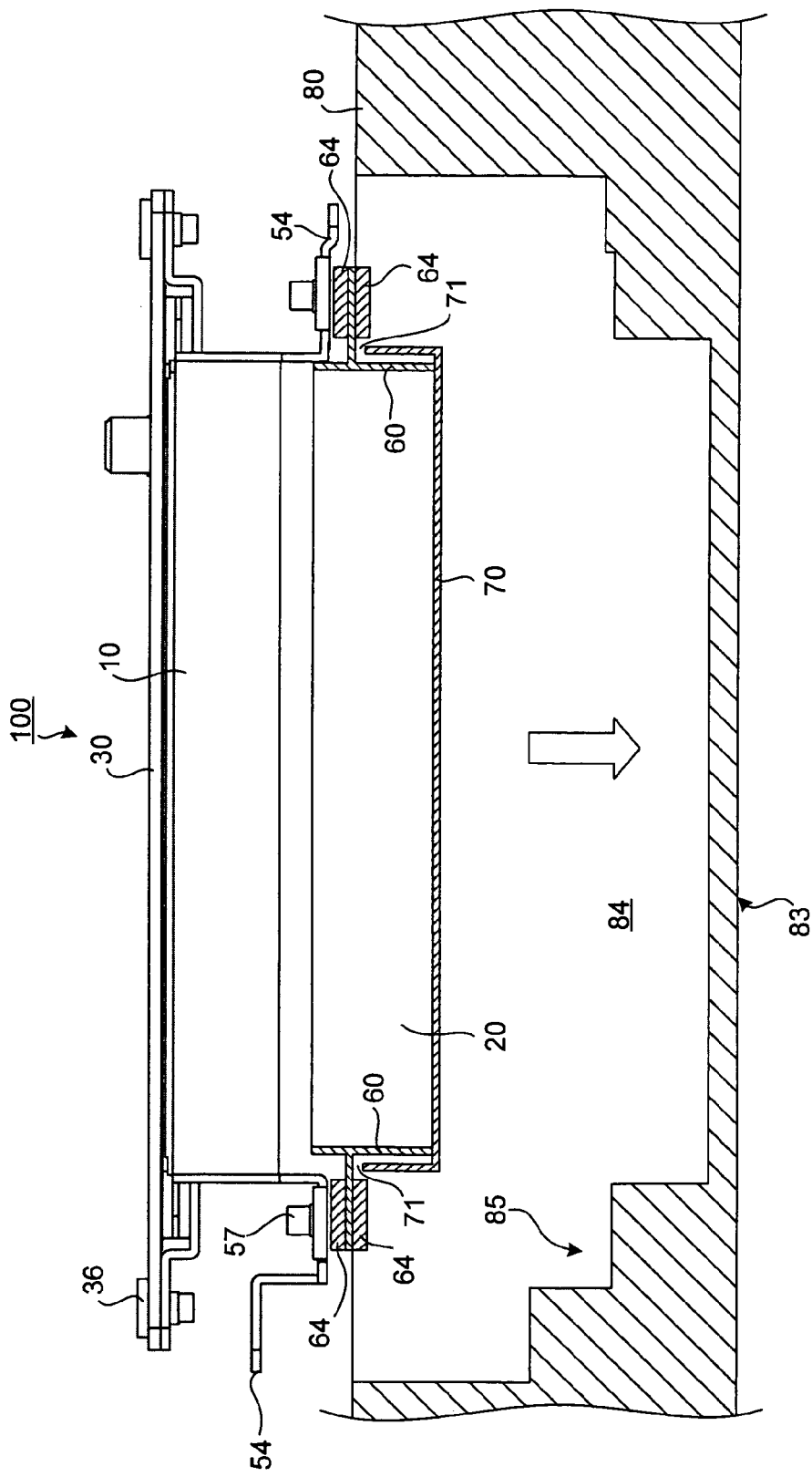
FIG. 26 is a cross-section of a part of the integral unit.
Figure 27:
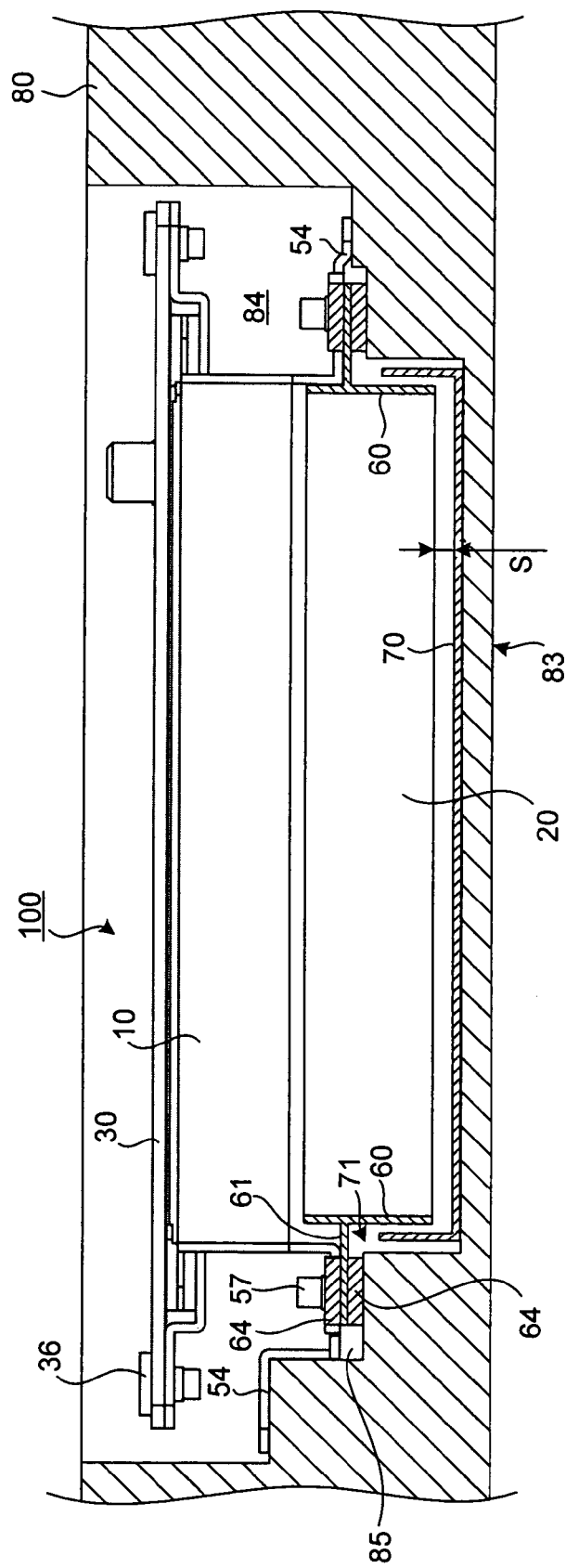
FIG. 27 is a cross-section of a part of the integral unit that is installed in a unit mounting section in the laptop computer.

FIG. 26 is a cross-section of a part of the integral unit 100 before the integral unit is installed in the unit mounting section 84 in the laptop computer 80. FIG. 27 is a cross-section of a part of the integral unit that is installed in the unit mounting section 84. FIG. 27 illustrates the arrangement of the second HDD 20 that is suspended inside the holding case 70 keeping a predetermined distance from the holding case 70.

As shown in FIGS. 26 and 27, when the second HDD 20 is installed in the unit mounting section 84, the second HDD 20, which is attached to the buffer fixing piece 60, is held suspended in the holding case 70 keeping the predetermined distance S. This is because the buffer fixing piece 60 gets caught by the step 85 in the mounting section, and lifted up through the buffer 64.

The holding case 70 is made of metal and closes the side near the palm rest 83 to protect the second HDD 20 from the external magnetic field. In addition, when the integral unit 100 is mounted in the unit mounting section 84, the integral unit 100 and the holding case 70 are separated by the distance S. Therefore, the second HDD 20 can be effectively protected also from strong magnetic field caused by a magnetic ring or a magnetic bracelet wore by a user above the palm rest 83.

As described above, the apparatus for mounting and the integral unit 100 that includes the apparatus for mounting can be easily assembled or disassembled. Furthermore, the apparatus for mounting and the integral unit 100 compactly accommodates the HDDs 10, 20 and also protect the HDDs 10, 20 from the external magnetic field. Therefore, the apparatus for mounting and the integral unit 100 are suitable for the laptop computer 80.

It is very common that the laptop computer 80 is used in harsh environments where it receives vibrations and shocks. The laptop computer 80 includes two of the HDDs 10, 20 for RAID, and writes data simultaneously to both the HDDs 10, 20 for duplication of the data. Even if an error occurs in the data that is stored in either one of the HDDs 10, 20 under the harsh environments with heavy vibrations and shocks, or even if either one of the HDDs 10, 20 breaks, it is possible to prevent a loss of the data and is possible to restart use of the data without taking time by retrieving the same data in the other one of the HDDs 10, 20.

Moreover, it is possible to recover the RAID 1 (mirroring) function just by exchanging one of the HDDs, which is broken, to an HDD that functions normally. Thus, latest data can always be duplicated and stored in each of the HDDs, unlike a case of data backup with software. Therefore, an efficient data management can be achieved.

As described above, the integral unit 100 can be easily assembled or disassembled by fastening or removing screws. Therefore, maintenance for the integral unit 100 is easy. In addition, if the apparatus for mounting is used, a user can add a RAID function to upgrade his/her laptop computer just by adding the second HDD 20.

While a case of an HDD as a storage device has been explained in the above embodiment, the present invention is not to be limited to this case. In other words, the present invention is applicable to any kind of storage devices that are required to be protected from vibrations, shocks, and external magnetic field. The storage device may be a readable medium, or both readable and writable medium. For example, the storage device may be an optical disk drive or an optical magnetic disk drive.

Furthermore, while a case of the laptop computer 80 as an electronic device that mounts the integral unit 100 has been explained in the above embodiment, the present invention is not to be limited to this case. In other words, the electronic device may be an in-car or a portable navigation system, an audiovisual device, or a game device that are used under a harsh condition with heavy vibrations. The present invention may also be applied to desktop PC that is required to be compact.

According to the present invention, the storage devices in an electronic device are avoided from magnetically interfering each other. Furthermore, the second storage device is protected from an external magnetic field.

Moreover, the storage devices can be protected from vibrations and shocks.

Furthermore, because the second storage device is protected from the external magnetic field, stable functions of the second storage device can be maintained. Therefore, data in the second storage device can be secured.

Moreover, the second holding unit can easily be manufacture by pressing, and the surface of the second holding unit enough to shield from the external magnetic field can easily be obtained.

Furthermore, positioning of the first holding unit and the second holding unit is easy. Therefore, work efficiency in assembly improves.

Moreover, a screw hole prepared in the storage device that is standardized can be used without losing workability for assembly or disassembly.

Furthermore, more than one storage device can be installed to realize duplication of data by writing the data simultaneously to more than one storage device. Therefore, even if one of the storage devices gets damaged, it is still possible to recover the data.

Moreover, a control board for the storage devices can be integrated with the storage devices in layers. Therefore, it is possible to save space, and facilitate maintenance.

Furthermore, more than one storage device and the control board for the storage devices can be handled as one unit integrated. Therefore, the maintenance can be performed easily.

Moreover, the integral unit can be handled as one piece. Therefore, maintenance for the electronic device itself can be facilitated.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An apparatus for mounting a plurality of storage in a mounting section in an electronic device, comprising:
a first holding unit that holds a first storage device;
a second holding unit that holds a second storage device; and
a connecting unit that directly attaches the first holding unit and the second holding unit to one another in such a manner that the first storage device and the second storage device directly face one another with a predetermined distance therebetween, wherein the apparatus further comprises:
a first buffer unit which is a shock absorber formed with an elastic material and through which the first holding unit holds the first storage device; and
a second buffer unit which is a shock absorber formed with an elastic material and through which the second holding unit holds the second storage device,
wherein the second holding unit holds the second storage device in such a manner that the second storage device is displaced away by a predetermined distance from an external magnetic field when the second storage device is mounted in the mounting section;
a first connecting brim unit in the first holding unit;
a second connecting brim unit in the second holding unit;
a first buffer fixing unit that is fixed to the first storage device with a first screw unit,
wherein the first buffer unit is fixed to the first buffer fixing unit;
a second screw unit that connects the first connecting brim unit and the second connecting brim unit;
a second buffer fixing unit to which the second buffer unit is fixed; and
a third screw unit that engages with screw hole units prepared in advance in the second storage device via the second buffer fixing unit.

2. The apparatus according to claim 1, wherein the second connecting brim has an arrangement that provides working space for screwing.

3. An apparatus for mounting a plurality of storage devices in a mounting section in an electronic device, comprising:
a first holding unit that holds a first storage device;
a second holding unit that holds a second storage device; and
a connecting unit that directly attaches the first holding unit and the second holding unit to one another in such a manner that the first storage device and the second storage device directly face one another with a predetermined distance therebetween, wherein the apparatus further comprises:
a first buffer unit which is a shock absorber formed with an elastic material and through which the first holding unit holds the first storage device; and
a second buffer unit which is a shock absorber formed with an elastic material and through which the second holding unit holds the second storage device,
wherein the second holding unit holds the second storage device in such a manner that the second storage device is displaced away by a predetermined distance from an external magnetic field when the second storage device is mounted in the mounting section;
wherein the first holding unit holds a control board that controls the first storage device and the second storage device.

4. An integral unit comprising:
an apparatus usable to mount a plurality of storage devices in a mounting section in an electronic device, the apparatus including
a first holding unit that holds a first storage device;
a second holding unit that holds a second storage device; and
a connecting unit that connects the first holding unit and the second holding unit in such a manner that there is a predetermined distance between the first storage device and the second storage device, wherein the apparatus further comprises:
a first buffer unit which is a shock absorber formed with an elastic material and through which the first holding unit holds the first storage device; and
a second buffer unit which is a shock absorber formed with an elastic material and through which the second holding unit holds the second storage device,
wherein the second holding unit holds the second storage device in such a manner that the second storage device is displaced away by a predetermined distance from an external magnetic field when the second storage device is mounted in the mounting section, and
the first holding unit holds a control board that controls the first storage device and the second storage device.

5. An electronic device comprising:
an integral unit that includes an apparatus usable to mount a plurality of storage devices in a mounting section in the electronic device, the apparatus having:
a first holding unit that holds a first storage device;
a second holding unit that holds a second storage device; and
a connecting unit that connects the first holding unit and the second holding unit in such a manner that there is a predetermined distance between the first storage device and the second storage device, wherein the apparatus further comprises:
a first buffer unit which is a shock absorber formed with an elastic material and through which the first holding unit holds the first storage device; and
a second buffer unit which is a shock absorber formed with an elastic material and through which the second holding unit holds the second storage device,
wherein the second holding unit holds the second storage device in such a manner that the second storage device is displaced away by a predetermined distance from an external magnetic field when the second storage device is mounted in the mounting section, and
the first holding unit holds a control board that controls the first storage device and the second storage device.

6. The electronic device according to claim 5, further comprising:
a guiding rail that is arranged in the mounting section, wherein the guiding rail electrically connects the integral unit installed in the mounting section.

7. The electronic device according to claim 5, further comprising a case that houses the integral unit, wherein air vents are arranged in the case near the integral unit.

8. The electronic device according to claim 5, wherein the electronic device is any one of a laptop computer, a desktop computer, an in-car or a portable navigation system, an audiovisual device, and a game device.

* * * * *